United States Patent
Pickering et al.

(10) Patent No.: US 11,538,042 B2
(45) Date of Patent: *Dec. 27, 2022

(54) SYSTEMS AND METHODS FOR PREVENTING IDENTITY FRAUD OF ELECTRONIC TRANSACTION DEVICE

(71) Applicant: WORLDPAY LIMITED, London (GB)

(72) Inventors: Daren Lee Pickering, London (GB); Jonathan Stewart Vokes, London (GB); Nicholas Telford-Reed, London (GB)

(73) Assignee: Worldpay Limited, London (GB)

(*) Notice: Subject to any disclaimer, the term of this patent is extended or adjusted under 35 U.S.C. 154(b) by 7 days.

This patent is subject to a terminal disclaimer.

(21) Appl. No.: 17/370,008

(22) Filed: Jul. 8, 2021

(65) Prior Publication Data

US 2021/0334806 A1 Oct. 28, 2021

Related U.S. Application Data

(60) Continuation of application No. 16/863,076, filed on Apr. 30, 2020, now Pat. No. 11,093,948, which is a (Continued)

(30) Foreign Application Priority Data

Jan. 26, 2016 (GB) ...................................... 1601393

(51) Int. Cl.
*G06Q 40/00* (2012.01)
*G06Q 20/40* (2012.01)
(Continued)

(52) U.S. Cl.
CPC ......... *G06Q 20/405* (2013.01); *G06K 19/145* (2013.01); *G06K 19/18* (2013.01);
(Continued)

(58) Field of Classification Search
CPC .. G06K 19/145; G06K 19/18; G06Q 20/3278; G06Q 20/341; G06Q 20/382; G06Q 20/405

See application file for complete search history.

(56) References Cited

U.S. PATENT DOCUMENTS

| | | | |
|---|---|---|---|
| 6,040,783 | A | 3/2000 | Houvener et al. |
| 6,178,426 | B1 | 1/2001 | Klein et al. |

(Continued)

FOREIGN PATENT DOCUMENTS

| | | |
|---|---|---|
| CA | 2932474 A1 | 6/2015 |
| CN | 204242233 U | 4/2015 |

(Continued)

*Primary Examiner* — Thien M Le
(74) *Attorney, Agent, or Firm* — Bookoff McAndrews, PLLC

(57) ABSTRACT

Tamper-proofing and secure identity validation techniques in a transaction processing system and secure electronic payment techniques are disclosed. A tamper-proof transaction processing device is provided and comprises at least two different strength adhesives to secure parts of the device together and a housing comprising at least a first and second protective layer. An electronic component comprising a secure element chip storing unique information relating to the chip is located between the first and second protective layer in the housing. In another aspect, a transaction processing system includes a payment instrument that is configured to approve only negative value and/or zero value transaction requests. Another aspect provides an identity card checking system and method where the identity card is brought into proximity of a data processing device and identity information is displayed on the screen of the data processing device for the period of time while the card is in proximity.

20 Claims, 18 Drawing Sheets

Related U.S. Application Data division of application No. 15/417,067, filed on Jan. 26, 2017, now Pat. No. 10,692,090.

(51) Int. Cl.
    *G06Q 20/38*     (2012.01)
    *G06K 19/14*     (2006.01)
    *G06K 19/18*     (2006.01)
    *G06Q 20/32*     (2012.01)
    *G06Q 20/34*     (2012.01)

(52) U.S. Cl.
    CPC ....... *G06Q 20/3278* (2013.01); *G06Q 20/341* (2013.01); *G06Q 20/382* (2013.01)

(56) References Cited

U.S. PATENT DOCUMENTS

| | | | |
|---|---|---|---|
| 6,253,820 B1 | 7/2001 | Landan et al. | |
| 6,286,999 B1 | 9/2001 | Cappel et al. | |
| 6,421,013 B1 | 7/2002 | Chung | |
| 7,039,813 B2 | 5/2006 | Algazi et al. | |
| 7,207,480 B1 | 4/2007 | Geddes | |
| 7,557,715 B1 | 7/2009 | Noakes et al. | |
| 8,238,540 B1 * | 8/2012 | Duva | H04M 3/51 379/265.09 |
| 8,577,016 B1 * | 11/2013 | Duva | G06Q 30/01 379/265.09 |
| 8,781,105 B1 * | 7/2014 | Duva | H04M 3/51 379/309 |
| 9,349,127 B2 | 5/2016 | Hurry | |
| 2002/0024590 A1 * | 2/2002 | Pena | G06Q 20/4014 348/14.08 |
| 2004/0139318 A1 | 7/2004 | Fiala et al. | |
| 2004/0148295 A1 | 7/2004 | Stevens | |
| 2004/0158351 A1 | 8/2004 | Rivalto | |
| 2004/0209028 A1 | 10/2004 | Gosselin et al. | |
| 2005/0045732 A1 | 3/2005 | Whitaker | |
| 2006/0005050 A1 | 1/2006 | Basson et al. | |
| 2006/0138223 A1 | 6/2006 | Schar | |
| 2008/0313079 A1 | 12/2008 | Van Bosch et al. | |
| 2008/0313082 A1 | 12/2008 | Van Bosch et al. | |
| 2010/0026816 A1 | 2/2010 | Bergstrom et al. | |
| 2011/0202466 A1 * | 8/2011 | Carter | G06Q 20/3224 705/67 |
| 2012/0246079 A1 * | 9/2012 | Wilson | H04W 12/062 705/67 |
| 2013/0262857 A1 | 10/2013 | Neuman et al. | |
| 2014/0058831 A1 * | 2/2014 | Duva | H04M 3/5175 705/14.45 |
| 2014/0314215 A1 * | 10/2014 | Duva | H04M 3/4878 379/265.09 |
| 2015/0120543 A1 | 4/2015 | Carnesi, Sr. | |
| 2015/0213512 A1 * | 7/2015 | Spievak | G06Q 30/0275 705/14.71 |
| 2015/0278810 A1 | 10/2015 | Ramatchandirane et al. | |
| 2016/0031624 A1 | 2/2016 | Pascua et al. | |
| 2016/0173693 A1 * | 6/2016 | Spievak | G06Q 30/0269 379/265.09 |
| 2016/0217437 A1 | 7/2016 | Park | |
| 2016/0232339 A1 | 8/2016 | Yang et al. | |
| 2018/0300730 A1 | 10/2018 | Telford-Reed et al. | |
| 2018/0306378 A1 | 10/2018 | Carpenter et al. | |

FOREIGN PATENT DOCUMENTS

| | | |
|---|---|---|
| CN | 204791052 U | 11/2015 |
| KR | 20140063104 A | 5/2014 |
| WO | 2013051029 A1 | 4/2013 |

* cited by examiner

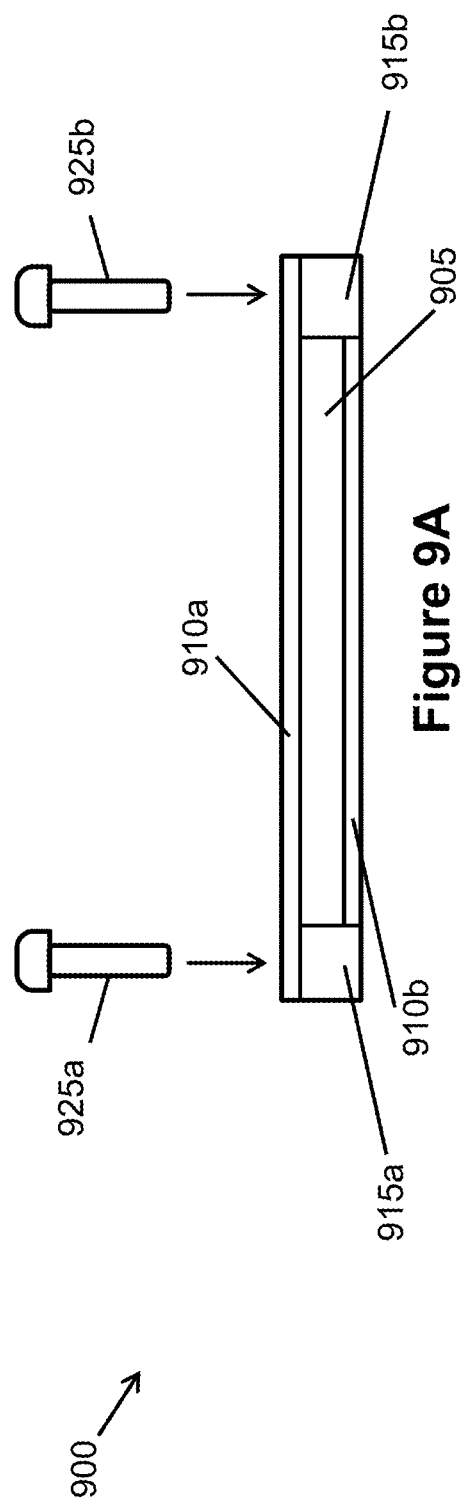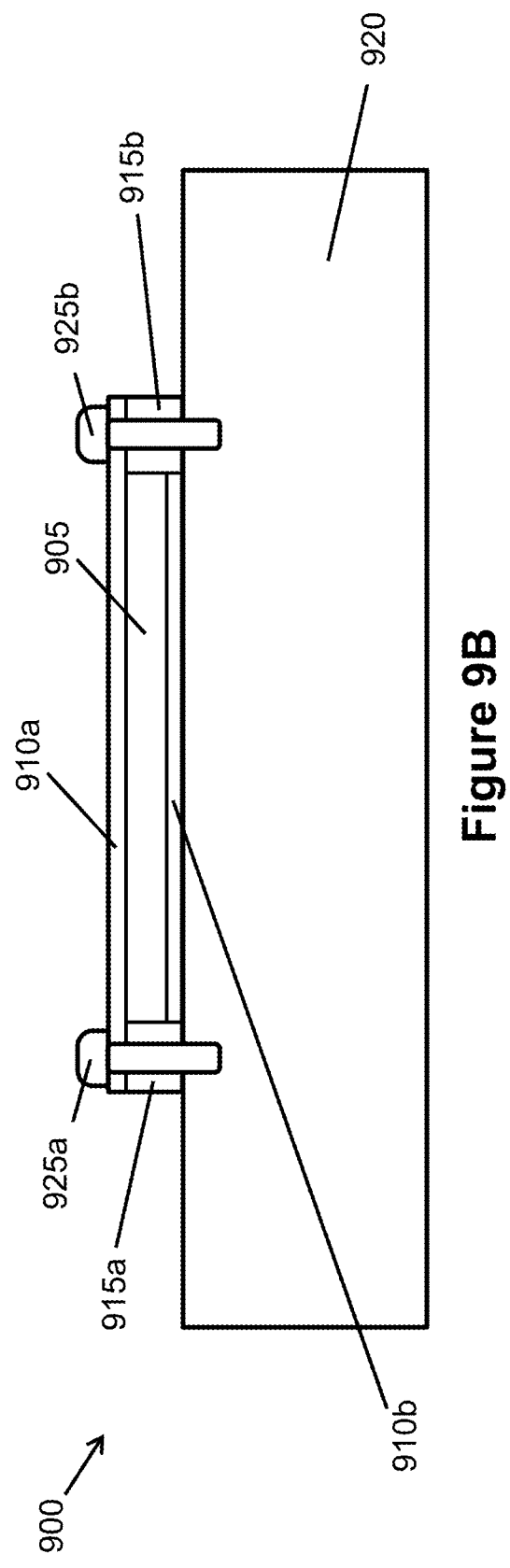

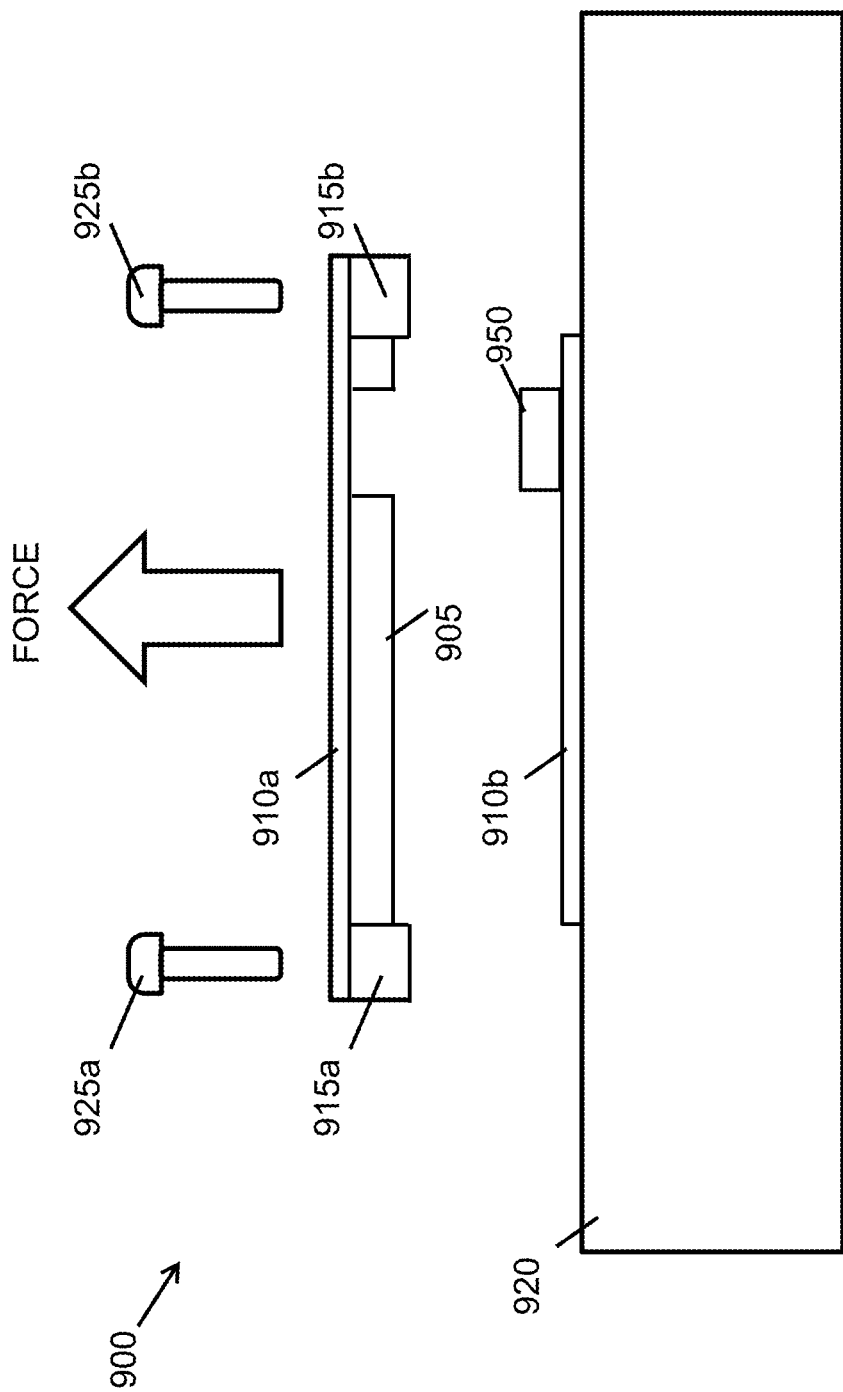

SYSTEMS AND METHODS FOR PREVENTING IDENTITY FRAUD OF ELECTRONIC TRANSACTION DEVICE

CROSS-REFERENCE TO RELATED APPLICATIONS

This application is a continuation of and claims the benefit of priority to U.S. patent application Ser. No. 16/863,076, filed on Apr. 30, 2020, which is a divisional of and claims the benefit of priority to U.S. patent application Ser. No. 15/417,067, filed on Jan. 26, 2017, which claims priority to United Kingdom Application No. 1601393.0 filed with the Intellectual Property Office of the United Kingdom on Jan. 26, 2016 and entitled "Electronic payment system and method," which are incorporated herein by reference in their entireties for all purposes.

FIELD OF INVENTION

This invention relates generally to tamper-proofing and secure identity validation techniques in a transaction processing system and to secure electronic payment techniques including an unattended point of sale.

BACKGROUND

Traditionally a Point of Sale (POS) within a merchant premises includes a POS terminal. The POS terminal typically comprises a computer that is configured to initiate electronic payment transactions by supplying customer provided information to a remote payment gateway, usually over the internet, and receiving a payment authorisation message from the payment gateway. The POS terminal may include or be in communication with related hardware such as a PIN Entry Device (PED) that reads an electronic payment card and verifies customer identity (e.g. via a PIN entry). The POS terminal is typically operated by a member of staff associated with the merchant, although 'self-service' POS terminals operated by customers are also available. In both cases, the POS terminal is located such that it can be easily monitored by the merchant to prevent fraudulent use. Typically, this is achieved by locating the POS terminal within the merchant's premises themselves. Transactions performed using this type of POS hardware are referred to as 'card present' transactions.

It is desirable to provide an inexpensive unattended payment mechanism for initiating electronic payments. By 'unattended' it is meant a payment mechanism that is either entirely unsupervised by a merchant, or is only infrequently supervised by a merchant.

One inexpensive unattended payment mechanism is to provide a facility to effect a transaction remotely from a location at which it is not possible or desirable to provide a supervised POS terminal. An example of this is a telephone transaction, where a customer telephones a representative of the merchant and provides payment card details over the telephone. These types of transaction are known in the art as 'card not present' transactions.

A problem with card not present transactions is that they are inherently less secure than transactions where a customer is present at a point of sale. For example, a third party could obtain a payment card without the knowledge of the authorised owner of the card and use this card to carry out a telephone transaction. As a result, card not present transactions carry greater risk and are correspondingly less desirable.

It is also possible to provide unattended POS hardware such as a PED and POS terminal for operation by the customer. This allows a card present transaction to be made, albeit at unattended POS hardware. However, in some cases this may not be a cost-effective solution because the amount of POS hardware required to fully serve customer needs may be prohibitively expensive. Also, the unattended POS hardware could be subject to interference such as a wedge attack which is known in the art and described, for example, in https://www.cl.cam.ac.uk/research/security/banking/nopin/. A wedge device is a device which sits between the real card and terminal, which can manipulate the messages flowing between them.

There is thus a need in the art for a cost-effective unattended payment mechanism having a greater level of security than card not present payment mechanisms.

Another problem with unattended payment systems is that they may be vulnerable to attack by a third party switching component(s) of the payment system with replacement component(s) that have the appearance of being genuine but which have actually allow fraudulent use of the payment system. An unsuspecting customer could then make use of the replacement component(s) without realising that they expose themselves to fraud by doing so. There is thus a need in the art for an unattended payment mechanism that clearly informs a potential customer when tampering has been attempted.

There is also a need to provide a secure way to check the identity of a user that has a payment card.

SUMMARY OF THE INVENTION

In a first aspect, the invention provides a tamper-proof transaction processing device for use in a transaction processing system, the device comprising: a housing comprising at least a first and second protective layer; an electronic component that is housed by the housing, the component comprising a secure element chip storing unique information relating to the chip; wherein the electronic component is located between the first and second protective layer, the device further comprising at least two different strength adhesives to secure different parts of the device together.

From a second aspect, an identity card checking system comprising: a data processing device that is communicatively coupleable to a payment instrument, the data processing device communicatively coupleable to a server via a second communication link, wherein the data processing device is configured to: initiate identity checking when the payment instrument is brought into close proximity of the data processing device to communicatively couple with the payment instrument; display identity information of the payment instrument registered owner on a display of the data processing device only while the payment instrument and data processing device are in close proximity, and to remove the identity information of the payment card owner from the display when the payment instrument and data processing device are not in close proximity From a third aspect, the present invention provide an identity card checking method comprising: a data processing device that is communicatively coupleable to a payment instrument, the data processing device communicatively coupleable to a server via a second communication link, wherein the method comprises: initiating an identity check when the payment instrument is brought into close proximity of the data processing device to communicatively couple with the payment instrument; displaying identity information of the payment instrument registered owner on a display of the data processing device only while the payment instrument and data processing device are in close proximity, and to remove the identity information of the payment card owner from the display when the payment instrument and data processing device are not in close proximity.

From a fourth aspect, an electronic payment system is provided, comprising: a data processing device that is communicatively coupleable via a first communication link to a payment instrument that is configured to approve only negative value payment requests and/or zero value payment requests, the data processing device communicatively coupleable to a server via a second communication link; and a service dispensing device that is communicatively coupleable to the server via a third communication link; wherein the data processing device configured to: receive a first input including at least a payment amount; transmit a payment request to the payment instrument, the payment request including at least the payment amount; receive a first data package generated by the payment instrument, the first data package based on the payment request; generate a transaction request data package based on the first data package; and transmit the transaction request data package to the server; wherein the data processing device and/or the server is configured to determine whether to approve or decline a transaction, and in the event the transaction is approved, the server is configured to generate a trusted data package based on the transaction request data package and transmit the trusted data package to the service dispensing device; and wherein the service dispensing device is configured to: receive the trusted data package from the server; determine the authenticity of the trusted data package; and in the event the trusted data package is determined to be authentic, provide one or more services.

From a fifth aspect, the invention provides a method for processing an electronic payment, comprising: receiving, at a data processing device, a first input including at least a payment amount; transmitting a payment request from a data processing device to a payment instrument configured to approve only negative value payment requests and/or zero value payment requests, the payment request including at least the payment amount; receiving a first data package generated by the payment instrument, the first data package based on the payment request; generating a transaction request data package based on the first data package; transmitting the transaction request data package to a server; determining, whether to approve or decline the transaction; and, in the event the transaction is approved: generating, at the server, a trusted data package based on the transaction request data package; transmitting the trusted data package to a service dispensing device; determining, at the service dispensing device, the authenticity of the trusted data package; and in the event that the trusted data package is determined to be authentic, providing one or more services at the service dispensing device.

BRIEF DESCRIPTION OF THE DRAWINGS

Embodiments of the present invention are now described, by way of example only, with reference to the accompanying drawings, in which:

FIG. 9A is a schematic diagram of a tamper-proof payment instrument;

FIG. 9B is a schematic diagram of the tamper-proof payment instrument of FIG. 9A mounted to a mounting surface;

FIG. 9E is a schematic diagram of an alternative tamper-proof payment instrument after tampering has been attempted;

DETAILED DESCRIPTION OF EMBODIMENTS

The terms listed below are understood to have the following meaning in this specification.

The term 'user' is understood to mean an entity wishing to purchase a service.

The term 'merchant' is understood to mean an entity providing the service.

The term 'EMV' takes its usual meaning in the art, i.e. 'Europay MasterCard and Visa'. As is known in the art, EMV secures electronic payments with additional functionality including:

Card authentication: a payment card is authenticated during a transaction, prohibiting the use of a counterfeit card. Each individual EMV transaction creates unique transaction data, preventing data captured from one transaction from being used fraudulently in another transaction.
   Transaction authorisation: issuer-defined rules can be set to authorise transactions. Transaction information is transmitted to a server associated with a payment instrument issuing entity, along with a transaction-specific cryptogram, to allow the issuer to decline or authorise the transaction based on their own rules.

References to an 'EMV transaction' or the like mean transactions according to EMV standard(s) as are well known to the skilled person.

The term 'electronic payment card' is understood to encompass both a physical payment card such as a plastic card including an EMV chip and also a virtual payment card that has been stored ('provisioned') on an electronic device such as a mobile telephone, or a wearable or other form factor, as is known in the art.

The term 'Cloud' takes its usual meaning in the art and is hence understood to mean a pool of configurable computing resources that are available for data processing tasks as and when needed.

The term 'service' is understood to encompass both tangible items being provided by the merchant or another party related to the merchant (the 'service provider') in exchange for payment from the user and also non-tangible operations being performed by the merchant in exchange for payment from a user. Examples of services include but are not limited to the vending of a product from a vending machine or other such dispenser, the provision of a hire item such as a bicycle for use by the user, the purchase of an item such as clothing from a retail outlet, the opening of a gate, turnstile, etc. to allow the user to access a restricted area, the provision of a mechanism for making a charitable donation to an identified cause, the redemption of an offer, the provision of media content to the user and the provision of one or more electronic ticket to the user. In the case where a person is performing an action in return for user payment, e.g. a haircut, the service is the indication that a valid payment for the action has been made.

Figure 1:
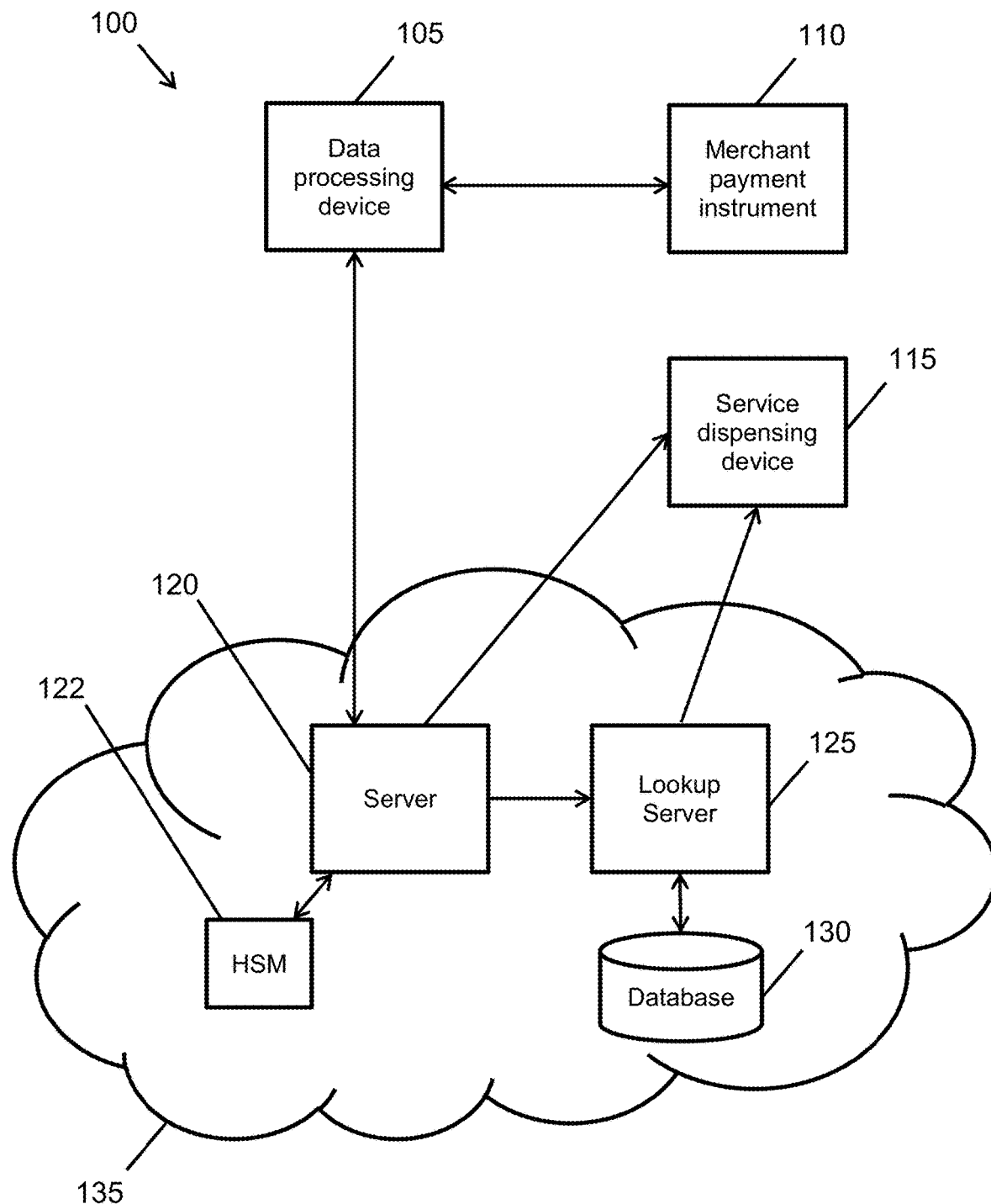
FIG. 1 is a schematic diagram showing a system according to an embodiment.

FIG. 1 shows a system 100 according to an embodiment. System 100 includes a data processing device 105, a merchant payment instrument 110, a service dispensing device 115, a server 120, a Hardware Security Module (HSM) 122, a lookup server 125 and a database 130. Server 120, lookup server 125 and database 130 are provided in Cloud 135 and could also be provided in a more traditional data centre or other typical server hosting arrangement.

In the interests of clarity of understanding only a single data processing device, merchant payment instrument and service dispensing device are shown in FIG. 1. It will however be appreciated that the invention is not limited to this and that system 100 may include one or more data processing devices like data processing device 105, one or more merchant payment instruments like merchant payment instrument 110, and/or one or more service dispensing devices like service dispensing device 115. In some cases there is a one to one relationship between service dispensing devices and merchant payment instruments, but the invention is not limited to this and in other cases there is a one to one relationship between merchant payment instruments and users. In a practical implementation there may be thousands, hundreds of thousands or even millions of users, service dispensing devices and/or merchant payment instruments.

Data processing device 105 is configured to function as a user payment acquiring device. By this it is meant that data processing device 105 is configured such that a user can use it to trigger a payment and determine the result of the payment (e.g., approved or declined). In the illustrated embodiment, data processing device 105 is a mobile telephone that has been configured to act as a secure data entry device, and preferably as a level 2 EMV terminal of the type well known in the art. This can be achieved by connecting data processing device 105 to an external card reading module (not shown) that facilitates the taking of an electronic payment. One example of a suitable external card reading module is provided by the Applicant under the name 'Worldpay Total Mobile Device'. Another example of a suitable module is provided by the Applicant under the name 'Worldpay Zinc'. A software application may be installed on data processing device 105 to facilitate control of the external card reading module. Alternatively, data processing device 105 may include the necessary hardware and/or software to trigger a payment and determine the result of the payment itself, such that no external card reading module is needed.

Data processing device 105 may be configured to act as an electronic wallet of the type known in the art such that it can be topped up with funds using a conventional payment instrument associated with the user. This conventional payment instrument is not merchant payment instrument 110 and should thus be distinguished from merchant payment instrument 110. Funds in the virtual wallet can be used to pay for services via merchant payment instrument 110. As an alternative to a virtual wallet, data processing device 105 may have a virtual card provisioned on it as is known in the art, and the virtual card can then be used to pay for services via merchant payment instrument 110.

It will be appreciated that data processing device does not have to be a mobile telephone and can alternatively be any electronic device that is capable of being configured to function as a user payment acquiring device. For example, data processing device 105 could alternatively be a tablet computer, a Pin Entry Device (PED), a laptop computer, a Personal Digital Assistant, etc. Preferably data processing device 105 is a user device in the sense that it is provided by the user as opposed to a merchant. A user device may be owned by the user.

As shown in FIG. 1, data processing device 105 is configured to communicate with merchant payment instrument 110. In the illustrated embodiment both data processing device 105 and merchant payment instrument 110 are configured for short-range communication, and in particular Near Field Communication (NFC) as is known in the art. Other short-range communication technologies such as Bluetooth, RFID, WiFi, Bluetooth Low Energy, magnetic transmissions, sound modulation, light or colour transmission, etc. can alternatively be used.

Data processing device 105 is configured to transmit a negative value payment request to merchant payment instrument 110 when communication between these two entities is enabled. In the illustrated embodiment in which NFC communication is used, communication is enabled by moving data processing device 105 proximate merchant payment card 110 such that data processing device 105 nearly or actually comes into physical contact with merchant payment card 110. This operation is often referred to as 'tapping' in the art. A negative value payment request is understood to be a payment request for a value that is less than zero; i.e. a negative rational number. It will be appreciated that the negative value payment request can include information indicating a positive number with another indicator to indicate it is a negative amount (or a refund as it is known in the art). That is, the actual transmission encoding of a negative number is likely to be a positive number with another indicator to indicate it is a negative amount. Merchant payment instrument 110 is configured to approve negative value payment requests, and may optionally also be configured to approve payment amounts of zero. Zero payment amounts may be used to verify the identity of a user. Merchant payment instrument 110 is configured such that it will not approve positive value payment requests, which are payment requests for a value that is greater than zero; i.e. a positive rational number. If desired, merchant payment instrument 110 can alternatively be configured to approve zero value payment requests only.

Data processing device 105 is also configured to transmit a payment device read request to merchant payment card. This is described in more detail later in this specification.

Merchant payment instrument 110 is a payment instrument that is associated with a merchant and which is provisioned such that it can only receive funds. However, it may be formed similarly to a conventional electronic payment card in that it is a physical payment card such as a plastic card including an EMV chip in a region of the component. A merchant payment instrument 110 is to be distinguished from a conventional electronic payment card which is associated with a user (rather than a merchant) and which can be used to make payments (rather than receive payments). In the illustrated embodiment merchant payment instrument 110 is an electronic payment card that has been provisioned to only receive funds. Merchant payment instrument 110 can alternatively be a virtual payment card that has been provisioned onto an electronic device. Provisioning of payment cards onto electronic devices including tokenisation and virtual cards per se is well known and so is not described in detail here. Whatever the form of merchant payment instrument, preferably merchant payment instrument 110 incorporates an EMV contactless chip of the type known in the art.

As merchant payment instrument 110 can only receive funds, it is not possible to make a payment from the associated merchant's account using merchant payment instrument 110. Thus if merchant payment instrument 110 is obtained by an unauthorised third party it cannot be used to carry out unauthorised payments. Additionally, the merchant payment instrument is far less expensive than POS hardware providing equivalent functionality, meaning that system 100 is far cheaper to implement than systems making use of POS hardware.

Merchant payment instrument 110 is linked with a payment account associated with the merchant. Preferably merchant payment instrument 110 is configured to enable Offline Data Authentication (ODA) as is known in the art, to allow data processing device 105 to authenticate merchant payment instrument 110 without having to contact another entity (e.g. a server). Preferably, merchant payment instrument 110 is configured to automatically accept all negative value payments.

Merchant payment instrument 110 has an associated unique identifier that allows a specific merchant payment instrument within a set of merchant payment instruments to be unambiguously identified. In the illustrated embodiment the unique identifier is a Primary Account Number (PAN') which typically takes the form of a sixteen digit number as known in the art. However, other unique identifiers such as a Payment Account Reference (PAR') can alternatively be used.

The unique identifier may alternatively be a token relating to one of these parameters, e.g. a tokenised PAN ('t-PAN'). Tokenisation per se is well known in the art and hence is not described in detail here. In the case that the unique identifier is a token, each user can have their own merchant payment instrument issued to them by a merchant, meaning that any payment made to the payment instrument is tied specifically to a known user and a known service. A t-PAN can be limited by duration, such that the t-PAN can only be used e.g. for a single transaction, for one hour, for one day, for one month, for one year, etc., or only for the lifetime of a particular data processing device. A t-PAN can additionally or alternatively be limited by channel, such that it can only be used to purchase a certain class of goods or services, for example. Use of a t-PAN may be preferred in some circumstances since it prevents the 'true' or 'real' PAN associated with merchant payment instrument 110 from being transmitted around the various components of system 100.

Merchant payment instrument 110 is configured to transmit a first data package to data processing device 105 in response to receipt of a payment request from data processing device 105. Merchant payment instrument 110 is also configured to transmit an identification data package to data processing device 105 in response to receipt of a merchant payment instrument read request from data processing device 105. Further details relating to this are provided later in this specification.

Service dispensing device 115 is any device that provides a service that the user has paid for. Examples include but are not limited to: a vending machine, a computer controlled turnstile or gate, a computer controlled lock, a media server, a server associated with a particular retail premises or set of premises, and a data processing device associated with a person who is to provide the service. The service provided can be a physical good, or a service for example a ticket to access a venue, it may also be a notification to a human or machine to provide a service. In the example of a hair dresser, the service dispensing device may be the hair dressers phone and the service dispensing event may be a simple notification on the hair dressers phone or phone application.

Service dispensing device 115 is associated with merchant payment instrument 110. By this it is meant that a payment involving merchant payment instrument 110 is automatically associated with service dispensing device 115. The association between service dispensing device 115 and merchant payment instrument 110 is stored in database 130 as discussed later in this specification. This association is preferably made clear to the user at the point where they initiate payment for a service. In the illustrated embodiment, the association is made clear by locating the merchant payment instrument 110 proximate the service dispensing device 115. Typically merchant payment instrument 110 will be located at around ten meters or less from service dispensing device 115, although the invention is not limited in this respect. A suitable separation distance between merchant payment card 110 and service dispensing device 115 will be determined according to the specifics of the situation at hand by a skilled person having the benefit of the present disclosure. Merchant payment instrument 110 may be secured directly on a surface of service dispensing device 115 using a securing means such as an adhesive.

In the case where merchant payment instrument 110 is a physical payment card, the payment card is preferably secured to a surface of service dispensing device 115 such that it is easily visible and accessible to a user attempting to make a payment. In some cases such as where purchased service is provided by a person, e.g. a haircut, it will not be possible to secure merchant payment instrument 110 to any surface. In such cases it is preferred that merchant payment instrument 110 is retained by the person providing the service, e.g. in a wallet or bag. A merchant payment instrument may also be attached to a lanyward that is associated with the identity of the merchant or the representative of the merchant (e.g. a charity collector). The lanyard card may also display a symbol indicating the ability to receive payments. Similarly, merchant payment instruments issued to individual users remain on the user's person for use when needed. In this case, the card PAN may be associated with the user's account and any payment will be used to purchase services associated with that account with the merchant.

Service dispensing device 115 is configured to: receive a trusted data package from lookup server 125, process the trusted data package, and provide a service based on the data contained in the trusted data package. Optionally, service dispensing device 115 may also transmit an acknowledgement message to lookup server 125 or server 120 indicating that a service has been successfully performed. These operations are described in more detail later in connection with FIG. 2.

Server 120 is configured to provide a payment acquiring service or payment initiation service as is known in the art. To enable this, server 120 is communicatively coupled to data processing device 105 via a communication link. The communication link can be any link known in the art suitable for communication with an entity within a Cloud like Cloud 135. In the illustrated embodiment the communication link is an internet-protocol link for communication across the internet as well known in the art. Many other suitable alternatives for the communication link will be apparent to a skilled person having the benefit of the present specification. Server 120 is configured to receive a transaction request data package from data processing device 105 and to process the transaction request data package to determine whether to approve or decline a transaction.

Server 120 is communicatively coupled to Hardware Security Module ('HSM') 122. HSM 122 stores private keys for decrypting encrypted data packages received from data processing device 105, as discussed later in this specification. HSMs per se are well known in the art and hence HSM 122 can be any suitable device that securely stores and manages digital encryption and decryption keys.

Server 120 is also communicatively coupled to lookup server 125 via any suitable communication link known to the skilled person, e.g. an internet-protocol link. Server 120 is configured to transmit a lookup request to lookup server 125 as described later in this specification. Optionally, server 120 may be configured to transmit an acknowledgement message to data processing device 105.

Lookup server 125 is communicatively coupled to database 130. Lookup server 125 is configured to receive a lookup request from server 120 and to process the lookup request by performing a lookup operation on database 130. Lookup server 125 is also configured to generate a trusted data package based on the result of the lookup operation and to transmit the trusted data package to service dispending device 115. To facilitate this, service dispensing device 115 is communicatively coupled to lookup server 125 via a communication link of the type described previously in this specification.

Database 130 may be a local database or a distributed database as known in the art. Database 130 stores a list of unique identifiers for all merchant payment instruments that have been issued by a relevant issuing authority. In the illustrated embodiment database 130 stores a list of PANs or t-PANs or virtual PANs, one for each merchant payment instrument. Each unique identifier in database 130 is associated with a service dispensing device identifier, which uniquely identifies a particular service dispensing device. In the illustrated embodiment the service dispensing device identifier is a Uniform Resource Locator (URL). Other suitable unique identifiers will become apparent to a skilled person having the benefit of the present disclosure including an IPv6 address.

It will be appreciated that an association can be formed between a particular merchant payment instrument and a particular service dispensing device by pairing the appropriate merchant payment instrument unique identifier with the appropriate service dispensing device identifier in database 130. That is, when lookup server 125 performs a lookup in database 130 based on the payment instrument unique identifier, the result will be the paired service dispensing device identifier.

In the case that merchant payment instrument 110 is assigned to a single user, database 130 may additionally store information relating to the assigned user. This information may include any of a name, address, date of birth, contact telephone number, contact email address, or biometric information such as a photograph of the user etc.

In an alternative embodiment, server 120 and lookup server 125 are combined into a single entity. In another alternative embodiment, lookup server 125 and database 130 are combined into a single entity. In a further alternative embodiment, server 120, lookup server 125 and database 130 are combined into a single entity. More generally it will be appreciated that in a Cloud environment any number of individual computing resources can be combined to provide the functionality of server 120, lookup server 125 and database 130. Collectively server 120, lookup server 125 and database 130 may be referred to as a 'service manager'.

Figure 2A:
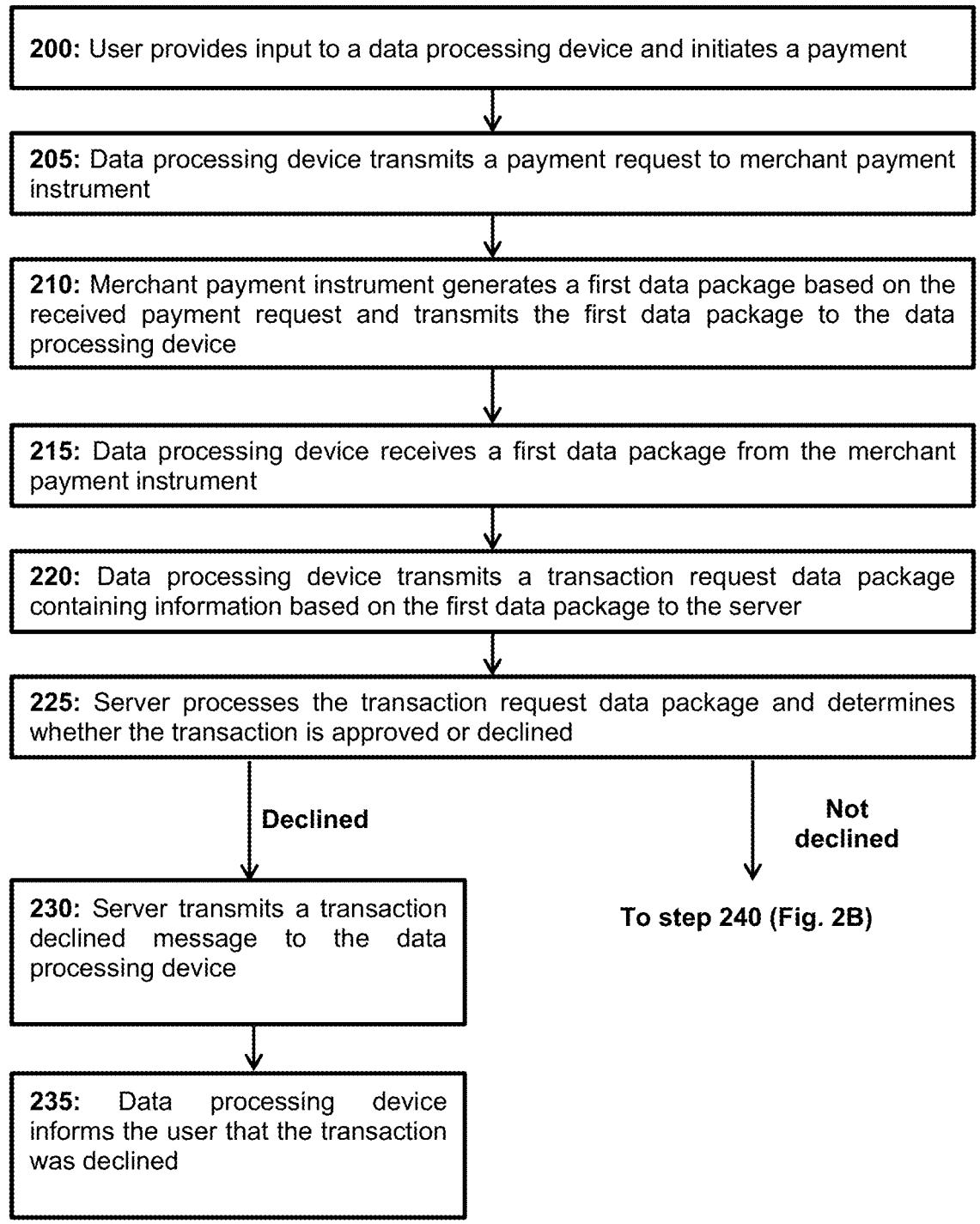
FIGS. 2A and 2B are a flow diagram showing operation of the system of FIG. 1 in a first payment taking mode.
Figure 2B:
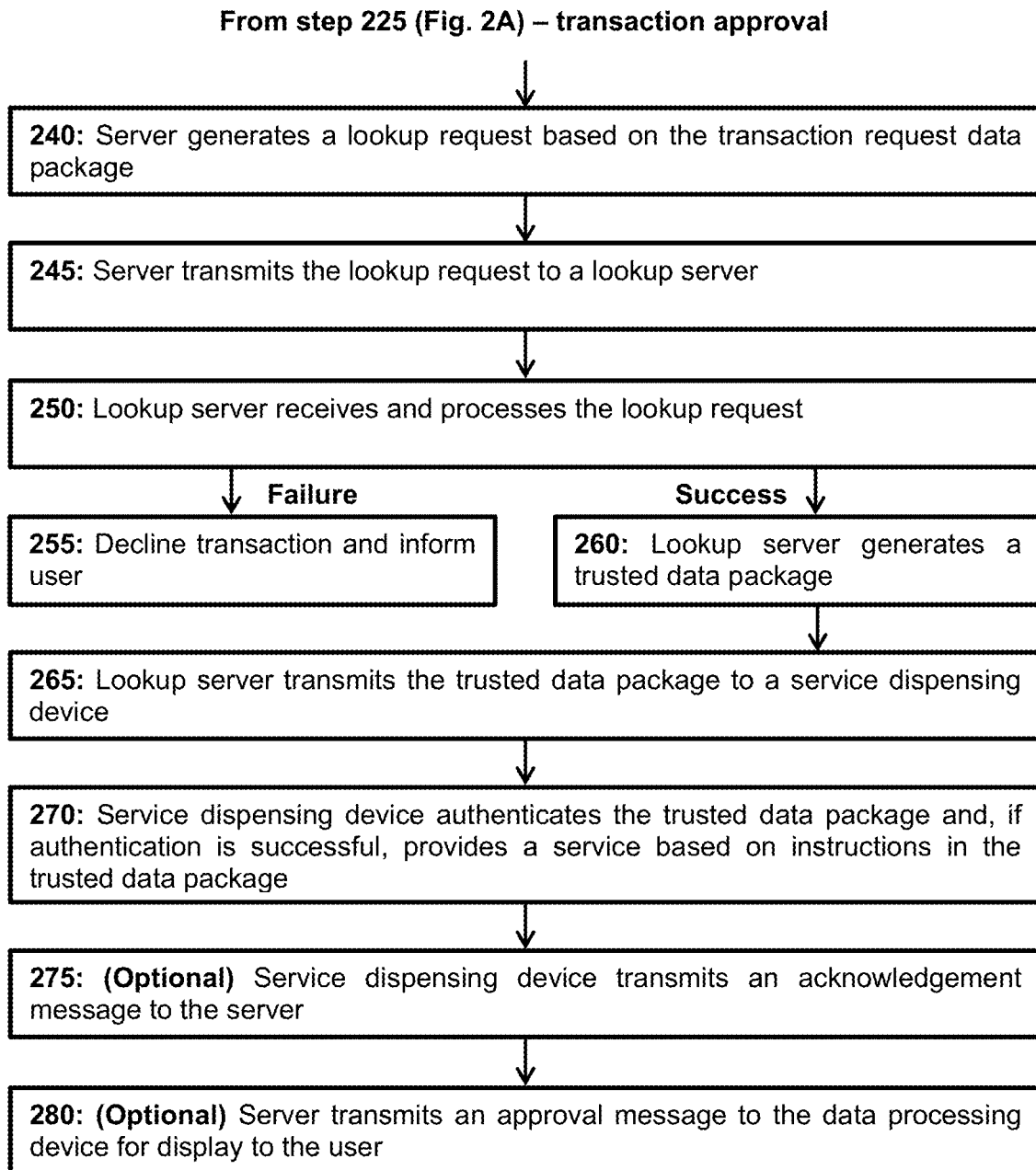
Figure 3:
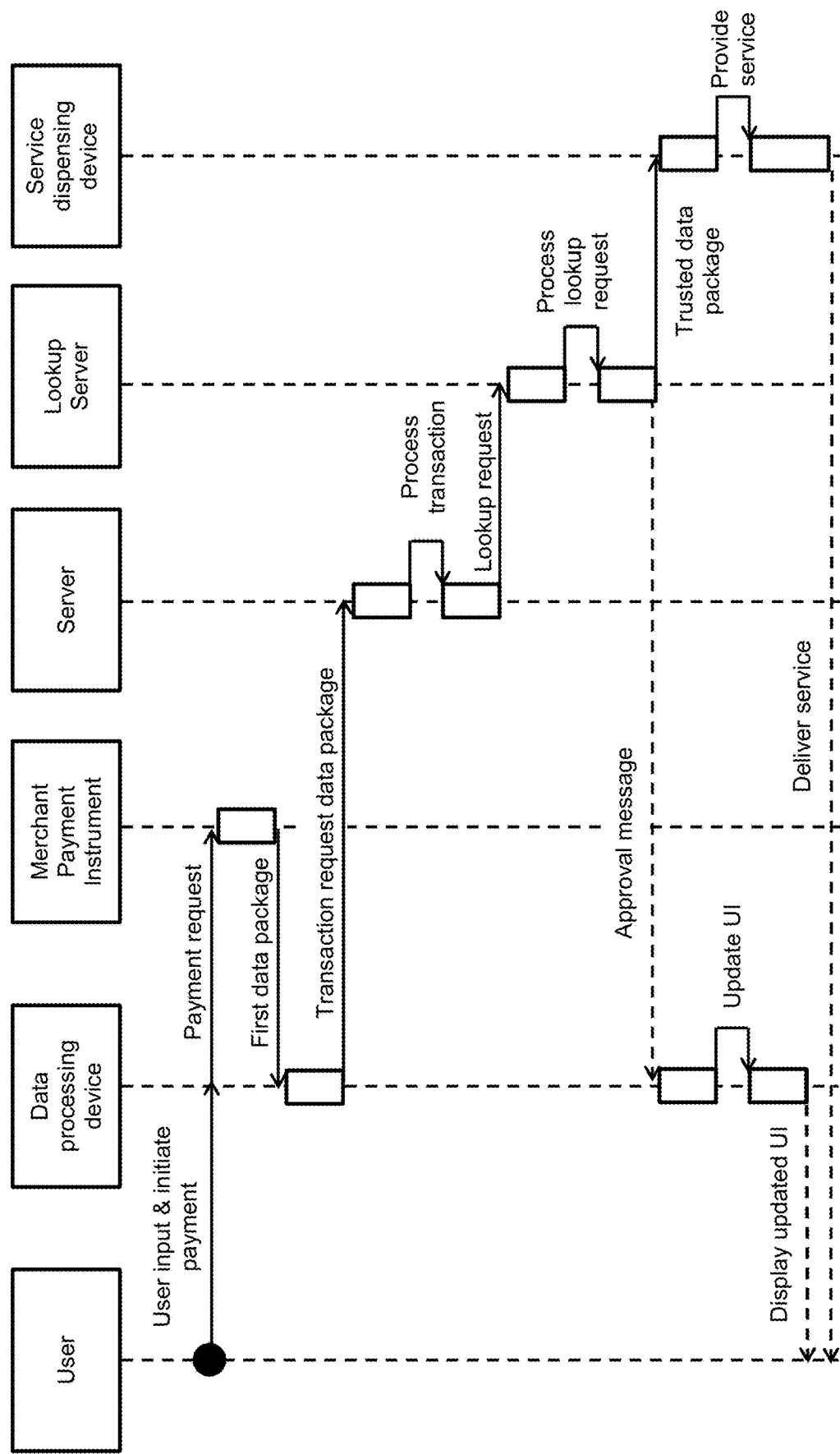
FIG. 3 is a sequence diagram showing operation of the system of FIG. 1 in a first payment taking mode where a transaction is approved.

Referring now to FIGS. 2A and 2B, the operation of system 100 in a first payment taking mode is described below. Reference is also made to FIG. 3, which shows the operation of system 100 under the situation where a transaction is approved.

In step 200, a user provides input to data processing device 105 and initiates a payment. The user input can be of any form known in the art, and in the illustrated embodiment takes the form of entering characters into data processing device using a keyboard, touchscreen, and the like. In the first payment taking mode the user input includes an amount that they wish to or are required to pay for a service, i.e. a positive rational number. Zero payment amounts may be allowed in some circumstances.

The user input is entered into a software application ('app') running on data processing device 105. Advantageously, this means that a user is aware of the payment amount before the transaction takes place. Preferably the software application runs the user input through a Trusted Execution Environment (TEE) of the type known in the art. This advantageously prevents malware and other forms of malicious software that may be present on data processing device 105 from gaining access to the information inputted by the user in step 200.

The user initiates a payment in step 200 by initialising a communication link between data processing device 105 and merchant payment instrument 110. In the illustrated embodiment this is achieved by 'tapping' the data processing device 105 against the merchant payment instrument 110 as described earlier in this specification. Other mechanisms for initiating the payment will be apparent to a skilled person having the benefit of the present disclosure. The user may be required to provide identification information such as a Personal Identification Number (PIN), biometric information, a physical control like an NFC or RFID card, and the like, as part of the payment initiating process. If required, this information is provided to data processing device 105 via a user input means such as a touch screen, keyboard or biometric scanner such as a fingerprint reader or camera to scan the iris, or the NFC interface in the case of a physical NFC or RFID card.

Whatever the form, initialisation of the payment causes data processing device 105 to transmit a negative value payment request to merchant payment instrument 110 (step 205). The negative value payment request includes information representative of the amount to be paid (such as the amount itself) and may include an electronic cryptogram (i.e. a digital signature) for data integrity validation purposes and the cryptogram preferably signs at least the amount that is to be paid. Other transaction-related data such as a unique identifier associated with merchant payment instrument 110 (e.g. a PAN or t-PAN), the date and/or time of the transaction, and unpredictable number, merchant identifier etc., may alternatively or additionally be included in the cryptogram and/or sent to the merchant payment instrument. Other such variations will be apparent to a skilled person having the benefit of the present disclosure.

The electronic cryptogram can be generated by encrypting transaction data using a public key of a key pair having its corresponding private key stored in HSM 122. It will also be appreciated that a payment instrument-generated electronic cryptogram may be generated at the merchant payment instrument 110 as explained in more detail below. Advantageously, there is no need for merchant payment instrument 110 to receive or store information relating to the user. This means that there is no risk of a third party extracting user information from a merchant payment card. This avoids the expense of ensuring that merchant payment card satisfies PCI requirements for payment systems, as known in the art.

On receipt of the negative value payment request or zero value payment request, in step 210 merchant payment instrument 110 generates a first data package based on the received payment request and transmits the first data package to the data processing device. The first data package includes a payment instrument-generated cryptogram which is signed by the private key (not shown) in the merchant payment instrument 110 which can sign at least the amount, the unpredictable number and the PAN. This could be the same or similar to a conventional EMV transaction where a cryptogram is generated at a chipped payment card. The merchant payment instrument 100 will also provide at least an indication as to whether the payment request has been approved or declined, as well as a unique identifier associated with merchant payment instrument 110. This means that the instrument 100 can decide whether to approve or decline the payment request offline locally at the instrument 100. The merchant payment instrument 100 may optionally request that the data processing go online (i.e. be sent) to the server 120 for a decision. This is known as an "online authorisation request" in the context of EMV processing and is known in conventional EMV processing. Information representative of the decision (offline approval/decline, online authorisation request) is included in the first data package either by adding the information to the payment instrument-generated cryptogram or without such security for sending to the data processing device 105. The payment request is declined when it is for a positive amount. Preferably, as mentioned earlier, merchant payment instrument 110 has Offline Data Authentication (ODA) enabled and is configured to automatically accept all negative value and/or zero value payments offline (without having to go online to the server 120), so that a payment is normally approved by merchant payment instrument 110 when it is for a negative amount or a zero amount. In the case that the payment request is for a positive amount, merchant payment instrument 110 is configured to still decline the request This first data package is passed to the data processing device 105 which then may also make a decision to approve locally, decline locally or go online. This is compared in the data processing device 105 with the decision from the merchant payment instrument and the result is confirmed. Typically, the least risk option is chosen which is that the transaction will go online. The merchant payment instrument-generated cryptogram is decrypted and checked when it gets to the server 120 with private key in the HSM 122 rather than at the data processing device 105. This particular aspect of approving locally, declining locally and going online is typical in conventional EMV processing and is known in EMV processing albeit with a regular consumer payment card (not a merchant payment instrument).

On approval of the payment (either by the data processing device 105 or online by the server 120), merchant payment instrument 110 has approved payment of a negative or zero amount to the user. This has the same end result as if the user had approved payment of a positive amount to the merchant that provides merchant payment card. Since merchant payment instrument 110 can only approve negative value payments, and in some cases negative value payments and/or zero value payments, it cannot be used to cause the merchant to make any positive (i.e. deductive) payments to another party. Thus, theft of merchant payment instrument 110 does not represent a security risk to the merchant since all that the party who has obtained the merchant payment instrument can use it for is to pay the merchant.

In step 215 data processing device 105 receives the first data package that was generated in step 210 from merchant payment instrument 110. Following this, in step 220 data processing device 105 transmits a transaction request data package containing information based on the first data package to server 120. The transaction request data package includes at least some of the data contained in the first data package and the cryptogram generated in step 205 by data processing device 105 and/or the merchant payment instrument 110. The transaction request data package preferably also includes information identifying the user. This information could be, for example, details such as the user's name, address, date of birth, etc., or it could be a unique identifier associated with a particular user such as customer number.

The first data package also indicates whether the payment was approved or declined. In the case that merchant payment instrument 110 declined the payment, step 220 may alternatively involve data processing device 105 indicating that the transaction was declined to the user and stopping processing the transaction such that the method ends at step 220. Alternatively, the method may continue to step 225 when a transaction is declined by merchant payment card 110, and in such a case the method will ultimately terminate at step 235. The latter mode of operation, although involving processing that is unnecessary from the point of view of the transaction itself, may be preferred in situations where it is of use to gather data relating to declined transactions, e.g. for system diagnostic or monitoring purposes.

In step 225 server 120 receives the transaction request data package and processes the transaction request data package to determine whether to decline the transaction. Such processing is well known in the art and is not described in further detail here. However, it is important to note that server 120 only determines whether the transaction should be declined at this point. Server 120 does not however approve the transaction at this stage; instead, further processing is carried out (step 240 onwards) before approval of the transaction is provided. As discussed above, one reason for declining the transaction at this stage is that merchant payment instrument 110 or data processing device 105 declined the payment.

Step 225 preferably also involves server 120 decrypting the cryptogram(s) using a private key that is paired with the public key that was used to generate the cryptogram. Successful decryption indicates that the first data package is genuine. Unsuccessful decryption may be an indication that the first data package has been tampered with, or that the first data package is not genuine. Unsuccessful decryption is therefore another reason that causes server 120 to decline the transaction.

In the case that the transaction is declined, server 120 transmits a transaction declined message to data processing device 105 (step 230) and data processing device 105 informs the user that the transaction was declined (step 235). The user can be informed in any way known to a skilled person, such as displaying a textual message indicating that the transaction has been declined on a display of data processing device 105. Notably, system 100 takes no further action after this point, and in particular a trusted data package is not generated and sent to service dispensing device 115. This means that declined transactions do not result in the provision of a service, nor is the user normally charged for a declined transaction.

In the case that the transaction is not declined at this stage, system moves on to step 240 in which server 120 generates a lookup request based on the transaction request data package. The lookup request includes at least the unique identifier associated with the merchant payment instrument that was involved in steps 205 to 215. In step 245 the lookup request is transmitted to lookup server 125 and in step 250 the lookup server receives and processes the lookup request. Processing the lookup request includes querying database 130 to determine if the unique identifier in the lookup request is found in database 130.

In the event that the unique identifier is not found in database 130, in step 255 the transaction is declined. A transaction declined message is displayed to the user in a manner similar to steps 230 and 235. Preferably, in this instance the transaction declined message indicates that the transaction was declined due to failure to find a unique identifier in database 130 that corresponds to the merchant payment card involved in steps 205 to 215. System 100 takes no further action after this point, and in particular a trusted data package is not generated and sent to service dispensing device 115. This means that transactions for which the merchant payment instrument unique identifier is not present in database 130 will not result in the provision of a service, nor will it result in the user being charged for a service that they have not received. This advantageously increases the security of system 100. Specifically, it prevents an unauthorised payment instrument that purports to be a merchant payment instrument from causing a service to be provided, and also from causing the user to mistakenly make a payment to an account associated with the unauthorised payment instrument.

To further improve the security of system, database 130 may optionally also includes information indicating the expected location of merchant payment instrument 110. For example, in the case of a turnstile the merchant payment instrument would be expected to be proximate the turnstile, e.g. within a meter or several meters of the turnstile. The location can be stored in database 130 in any suitable format known to a skilled person, e.g. GPS co-ordinates, Bluetooth beacon identifier and signal strength.

In cases where database 130 includes merchant payment card location information, the transaction request data package transmitted by data processing device 105 (see step 220) preferably also includes data relating to the location of data processing device 105 when the payment was initiated (steps 200 and 205). This data can be of any suitable type known to a skilled person, e.g. GPS co-ordinates, Bluetooth beacon identifier and signal strength. The lookup request generated in step 240 also includes the data processing device location when available. The processing of the lookup request includes comparing the location of the data processing device to the expected location of the merchant payment instrument. If these locations do not match, then the transaction may be declined and the user informed (step 255).

Here, 'match' is understood to mean that the respective locations are found to be sufficiently similar to one another to deem it very likely that the data processing device was in the vicinity of the expected location of the merchant payment instrument when a payment was initiated by the user. The criteria chosen for a match will depend on the specific implementation details of system 100. In some cases locations within one meter of each other may be deemed to match. In other cases locations within ten meters of each other may be deemed to match. In further cases locations within one hundred meters of each other may be deemed to match. Other appropriate values for the matching criteria will be selected by a skilled person having the benefit of the present disclosure. The resolution of the mechanism used to determine the location of the data processing device 105 is preferably taken into account when setting the criteria for what constitutes a match between two locations.

Comparing the location of data processing device 105 to the expected location of merchant payment instrument 110 further increases the security of system 100. This is because this prevents a third party who has moved a genuine merchant payment instrument from its authorised location to an unauthorised location from causing users to pay for a service at an unauthorised location.

In the event that the unique identifier associated with the merchant payment instrument that was involved in steps 205 to 215 is found in database 130, and optionally the location of data processing device 105 is deemed to match the location for merchant payment instrument 110 that is stored in database 130, then in step 260 the lookup server generates a trusted data package. The trusted data package is a package that includes at least a set of instructions for service dispensing device 115 to provide one or more service(s), as may also include some user information relating to the user that initiated the transaction. The set of instructions includes at least one parameter relating to the service(s) that are to be provided by service dispensing device 115. The at least one parameter may be, for example, the type of service to be provided, the duration for which the service should be provided, etc. The user information may be, for example, a user ID which may be retrieved from database 130.

The trusted data package may be encrypted using any suitable encryption method known in the art, including but not limited to symmetric encryption methods and asymmetric encryption methods. Additional HSMs (not shown) may be coupled to server 120, lookup server 125 and/or service dispensing device 115 to enable private keys to be securely stored by these elements of system 100. In the illustrated embodiment, the trusted data package is an encrypted trusted data package.

The trusted data package may also include details relating to the nature of the service that is to be provided, such as an identification of which of a set of services provided by service dispensing device should be provided, an amount paid by the user, a duration for which the service is to be provided for, a start time for initiating provision the service, an end time to cease providing the service, a start date for initiating provision of the service and/or an end date for ceasing provision of the server. This list is not exhaustive and the trusted data package may include any other information deemed useful by a skilled person.

In step 265 lookup server 125 transmits the trusted data package to service dispensing device 115. Preferably the trusted data package is transmitted over a secure channel, e.g. a TLS/SSL/VPN channel. Any form of transmission can be used, including but not limited to a transmission to an internet address, a transmission to a network address and a transmission using a telecommunications protocol (e.g. SMS or and mobile notification).

In step 270 service dispending device 115 determines the authenticity of the trusted data package and, if authentication is successful, provides a service based on instructions in the trusted data package. In the illustrated embodiment service dispensing device 115 determines the authenticity of the trusted data package by attempting to decrypt the trusted data package. This can also include additional checks for message integrity and checks of the cryptogram(s) and data used for the generation of the cryptogram(s). In the event decryption and checks are successful the trusted data package is determined to be authentic, at which point service dispensing device 115 provides one or more services based on information in the trusted data package. Advantageously, attempts to obtain a service without payment by transmitting unauthorised data packages that simulate a trusted data package directly to service dispensing device 115 will fail because the unauthorised data package will not be authenticated as it has not been encrypted with a valid signature/cryptogram using the correct encryption key and hence decryption of this unauthorised data package will fail. It will thus be immediately apparent to service dispensing device 115 that the data package is not genuine.

Authentication of the trusted data package can be provided by use of encryption/decryption, as discussed above. Other authentication mechanisms can alternatively be used. For example, the trusted data package may include an authorisation message from server 120 of a type pre-agreed with service dispensing device 115. Service dispensing device 115 may determine whether such an authorisation message is present in the trusted data package and only provide the relevant service where a valid authorisation message is found. The authorisation message is thus used to authenticate a trusted data package. In this case, a secure channel such as a TLS/SSL/VPN channel is preferably provided between Cloud 135 and service dispensing device 115.

For additional security, multiple distinct authentication mechanisms may be used; for example, the authorisation message discussed above may itself be encrypted. Further suitable authentication methods will become apparent to a skilled person having the benefit of the present disclosure.

Optionally, during or after the provision of a service, service dispensing device 115 may transmit an acknowledgement message to server 120 (step 275) indicating that a service has been provided. The acknowledgement message can include any additional information deemed appropriate by a skilled person, including but not limited to a message for display to the user, user instructions, digital coupons, tickets, vouchers, loyalty information and/or a link to a digital download file. The digital download file may be encrypted using a public key provided by data processing device 105 (a 'user public key'), such that data processing device 105 is able to decrypt the digital download file on receipt. In this case the first data package transmitted in step 220 includes the user public key, as does the lookup request and the trusted data package, to allow the user public key to be routed through system 100 from data processing device 105 to service dispensing device 115.

On receipt of the acknowledgement message, in optional step 280 server 120 transmits an approval message to data processing device 105 for display to the user. The approval message is based on the acknowledgement message and in particular can include the encrypted digital file if one is generated.

It will be appreciated that in embodiments where server 120 is combined with lookup server 125 and possibly database 130, steps 240 to 265 are all performed by server 120.

Figure 4:
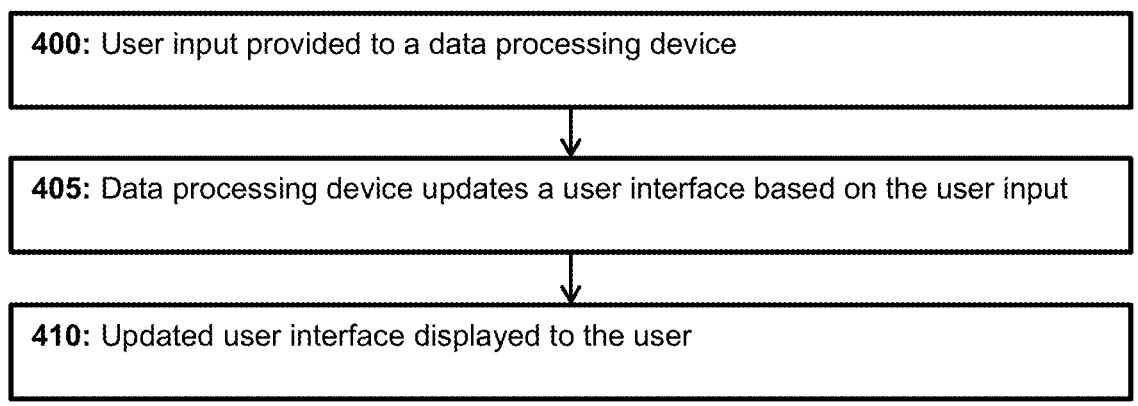
FIG. 4 is a flow diagram showing operation of the system of FIG. 1 in a user input mode.
Figure 5:
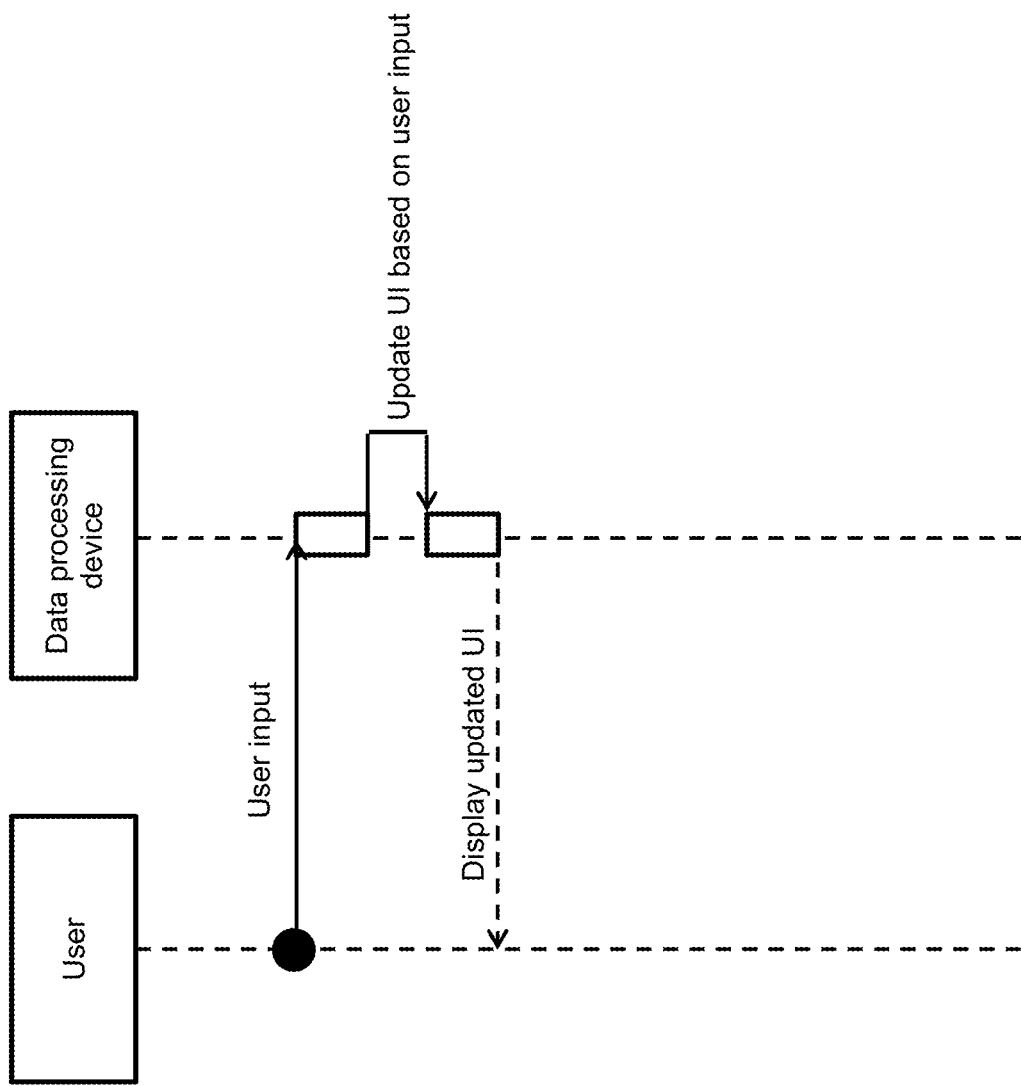
FIG. 5 is a sequence diagram showing operation of the system of FIG. 1 in a user input mode.

Referring now to FIGS. 4 and 5, the process by which a user can set an amount to pay is described. Step 200 of FIG. 2 may comprise the steps shown in FIG. 4.

In step 400, user input is provided to data processing device 105. The user input can be provided by any suitable user input means including but not limited to a touchscreen and/or a keyboard. The user input includes at least an amount that the user wishes to pay, i.e. a positive rational number. Zero value transactions may also be permitted, if desired.

In step 405 data processing device 105 updates a user interface based on the user input provided in step 400. The user interface is a user interface of a software application that is installed on data processing device 105 and provided at least for the purposes of making payments in system 100. This may be a trusted user interface, as it is known in the art, to protect the integrity of the amount keyed and the amount displayed.

In step 410 the updated user interface is displayed to the user. The updated user interface preferably includes an indication that the amount to pay. Other information such as the service(s) that the user is paying for may also be displayed, if desired.

Figure 6:
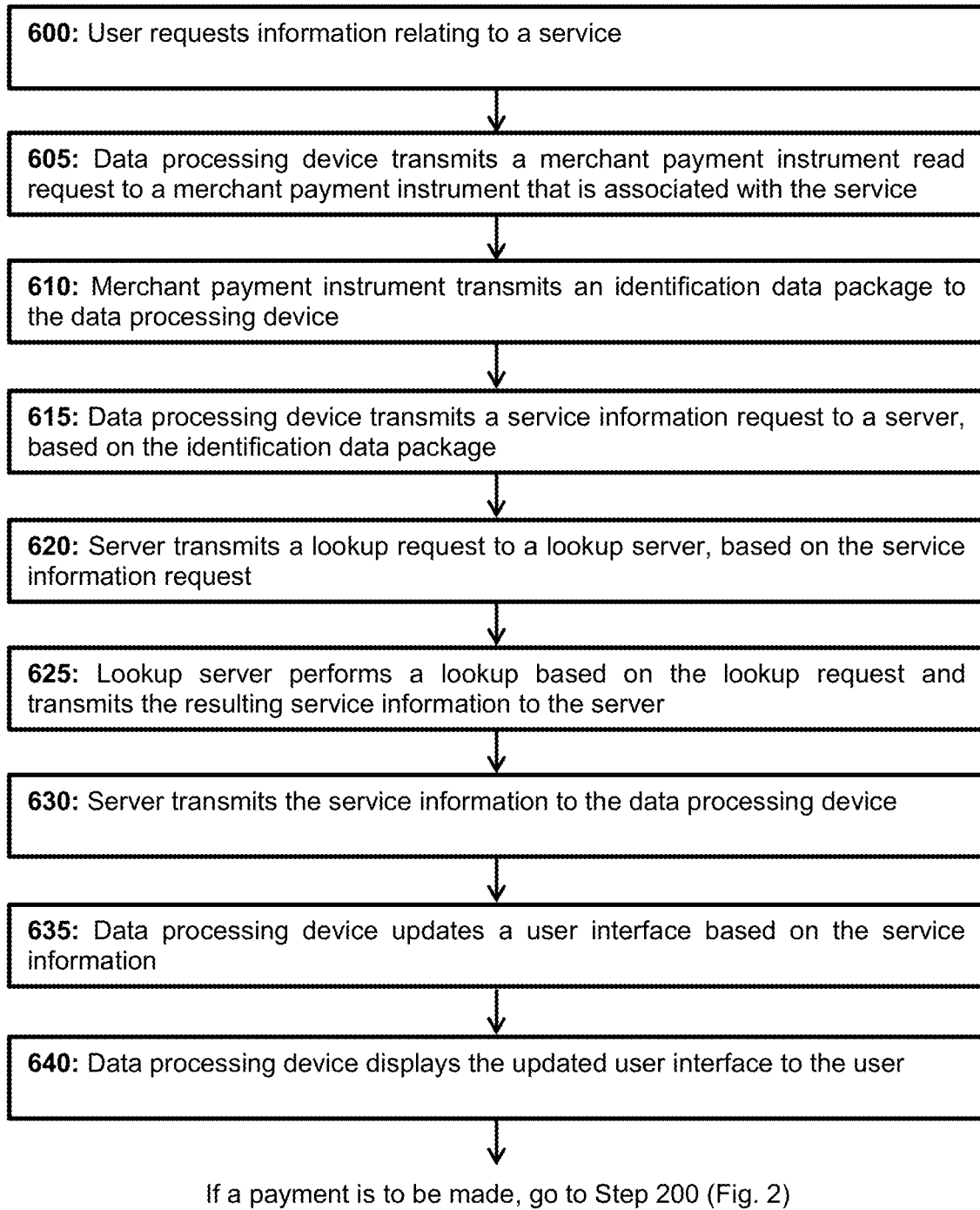
FIG. 6 is a flow diagram showing operation of the system of FIG. 1 in a service information request mode.
Figure 7:
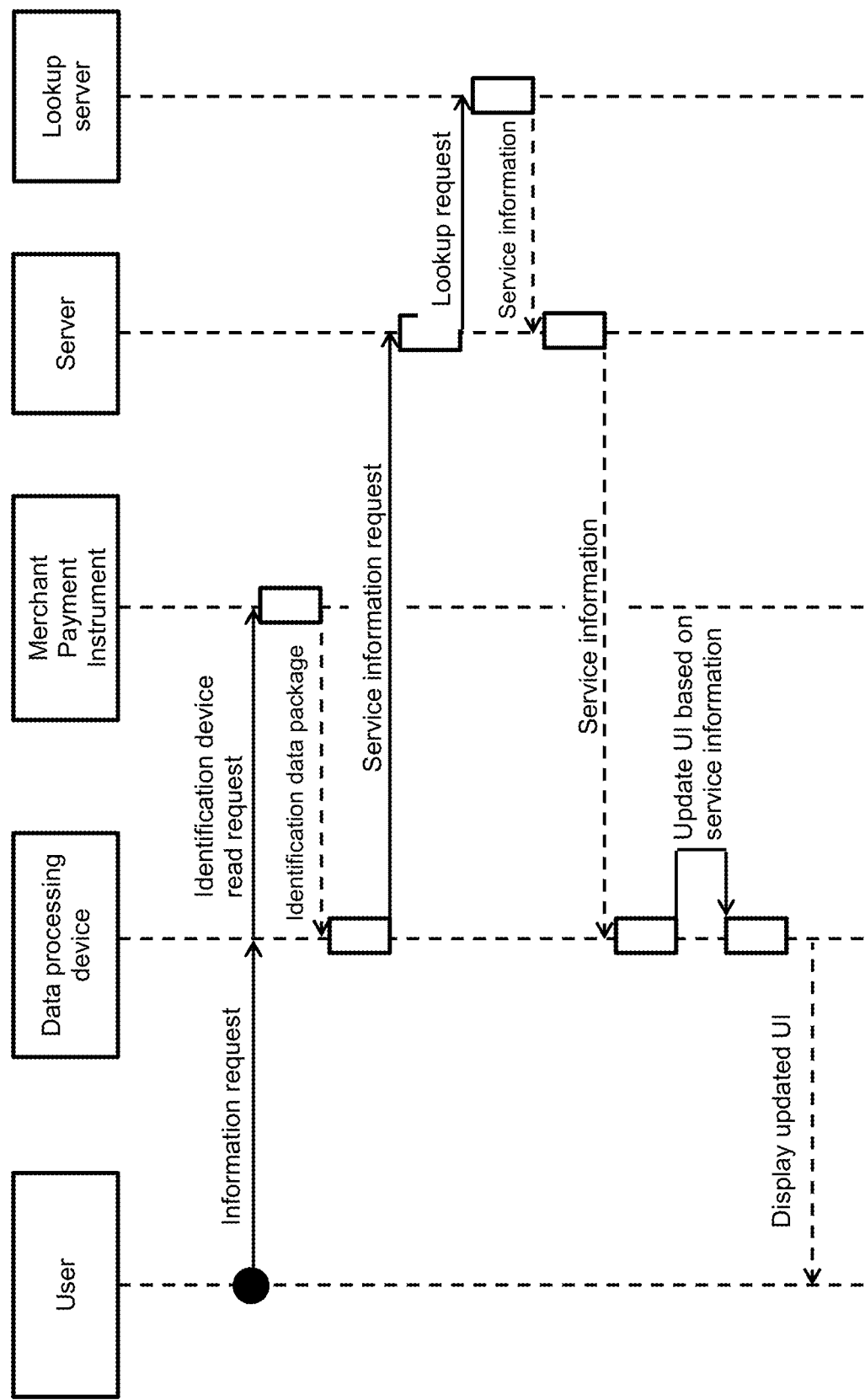
FIG. 7 is a sequence diagram showing operation of the system of FIG. 1 in a service information request more.

Referring now to FIGS. 6 and 7, the operation of system 100 in a service discovery mode is described. Service discovery mode provides a mechanism for a user to discover which service(s) are available to them from a particular service dispensing device and also how much these services cost.

In step 600, a user requests information relating to a service. The information can include, for example, the nature of the service being provided and/or the cost for the service. The user may initiate an information request by tapping merchant payment instrument 110 with data processing device 105.

In step 605, data processing device 105 transmits a merchant payment instrument read request to merchant payment instrument 110. The merchant payment instrument read request includes information that indicates that data processing device 105 requires information relating to the service that is associated with merchant payment instrument 110. The action for initiating service discovery is preferably the same as for initiating a transaction, and in the preferred case this action is the aforementioned 'tapping' action where data processing device 105 is brought proximate merchant payment instrument 110 such that a transient short-range communication link is enabled between these devices. Data processing device 105 may therefore be configured to distinguish between service discovery and the initiation of a transaction. This configuration may be achieved by data processing device 105 determining as part of step 605 whether an amount that the user intends to pay for a service has been entered into data processing device 105. In the event that a payment amount has been entered, data processing device proceeds to initiate a transaction as described in connection with FIGS. 2A, 2B and 3. In the event that a payment amount has not been entered, data processing device proceeds to initiate a service discovery event by transmitting a read request.

On receipt of a read request, in step 610 merchant payment instrument 110 transmits an identification data package to data processing device 105. The identification data package includes at least the unique identifier associated with the merchant payment instrument 110. The unique identifier is of the type described earlier in connection with FIG. 2, such as a PAN or t-PAN.

In step 615 data processing device 105 transmits a service information request to server 120. The service information request is based on the identification data package and includes at least the unique identifier associated with merchant payment instrument 110. Server 120 generates a lookup request based on the service information request and transmits the lookup request to lookup server 125 (step 620). The lookup request also includes at least the unique identifier associated with merchant payment instrument 110. If lookup functionality is provided by server 120 itself then step 620 can be omitted.

In step 625 lookup server 125 performs a lookup based on the lookup request and transmits the resulting service information back to server 120. If lookup functionality is provided by server 120 then step 625 is performed by server 120. The lookup operation involves querying database 130 to determine if the unique identifier in the lookup request is found in database 130. In the event the unique identifier is found, the lookup operation returns either information relating to the service that merchant payment card 110 is associated with or a link to a repository where such information can be found. For example, in the latter case the lookup request could return a URL to a web page containing information relating to the relevant service. The information relating to the service can be any information deemed relevant by a skilled person, such as a price or set of prices for a service or set of service, a list of options for the services, and the like.

In step 630 server 120 transmits the service information to data processing device 105 and in step 635 the data processing device updates a user interface based on the service information. The update to the user interface preferably includes at least the addition of a price for the service that the user has requested information about. Optionally, the update to the user interface may cause the user interface to include a set of service-related options that are available for the user to select.

Figure 8:
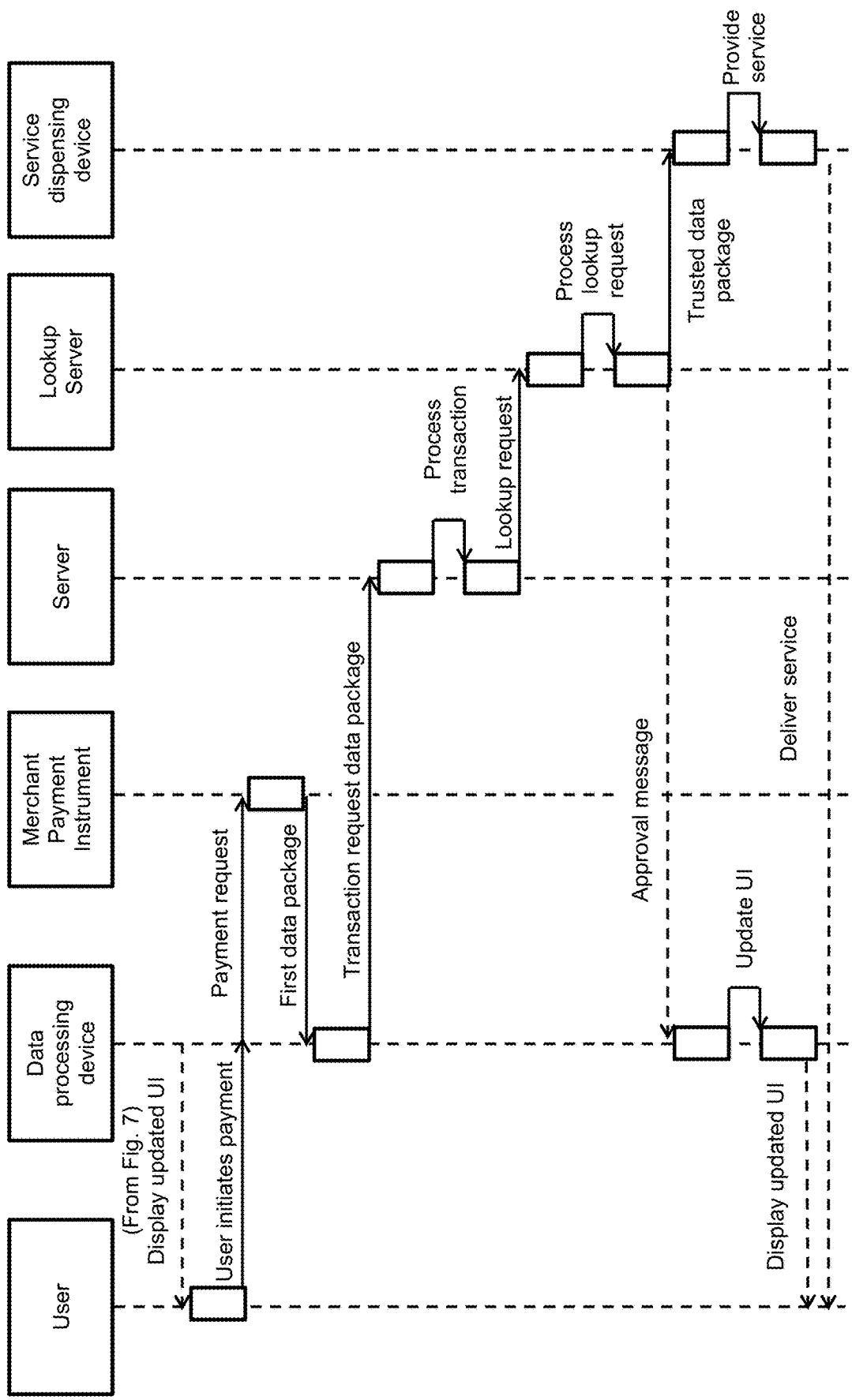
FIG. 8 is a sequence diagram showing operation of the system of FIG. 1 in a second payment taking mode where a transaction is approved.

Following this, in step 640 data processing device 105 displays the updated user interface to the user. In preferred cases where the price of the service has been automatically populated, the user can now proceed to initiate a payment as described in connection with FIG. 2. In this case it will be appreciated that step 200 of FIG. 2 is modified because the user no longer needs to provide user input to data processing device 105, since the cost of the service has already been automatically populated in the service discovery operation of FIG. 6. This operational mode is shown in FIG. 8, which is a sequence diagram showing operation of system 100 in a payment mode following a service discovery operation of FIG. 7.

It will be apparent from the foregoing that it is not possible to initiate a payment without the user first either:
a) manually entering an amount to pay (i.e. FIG. 4); or
b) causing data processing device 105 to initiate a service discovery operation.

This advantageously means that at the point a transaction is initiated the user always has knowledge of the amount that they are about to pay. This improves the security of system 100 as it prevents a user from paying an unknown amount for a service.

It will be appreciated by a skilled person having the benefit of the present disclosure that one aspect of the invention described herein provides electronic payment systems and methods that are suitable for unattended use. Specifically, the present invention provides a heretofore unrealised level of security to unattended electronic payment systems. As a result, the present invention and aspects thereof represent a significant improvement to the art.

Figure 9C:
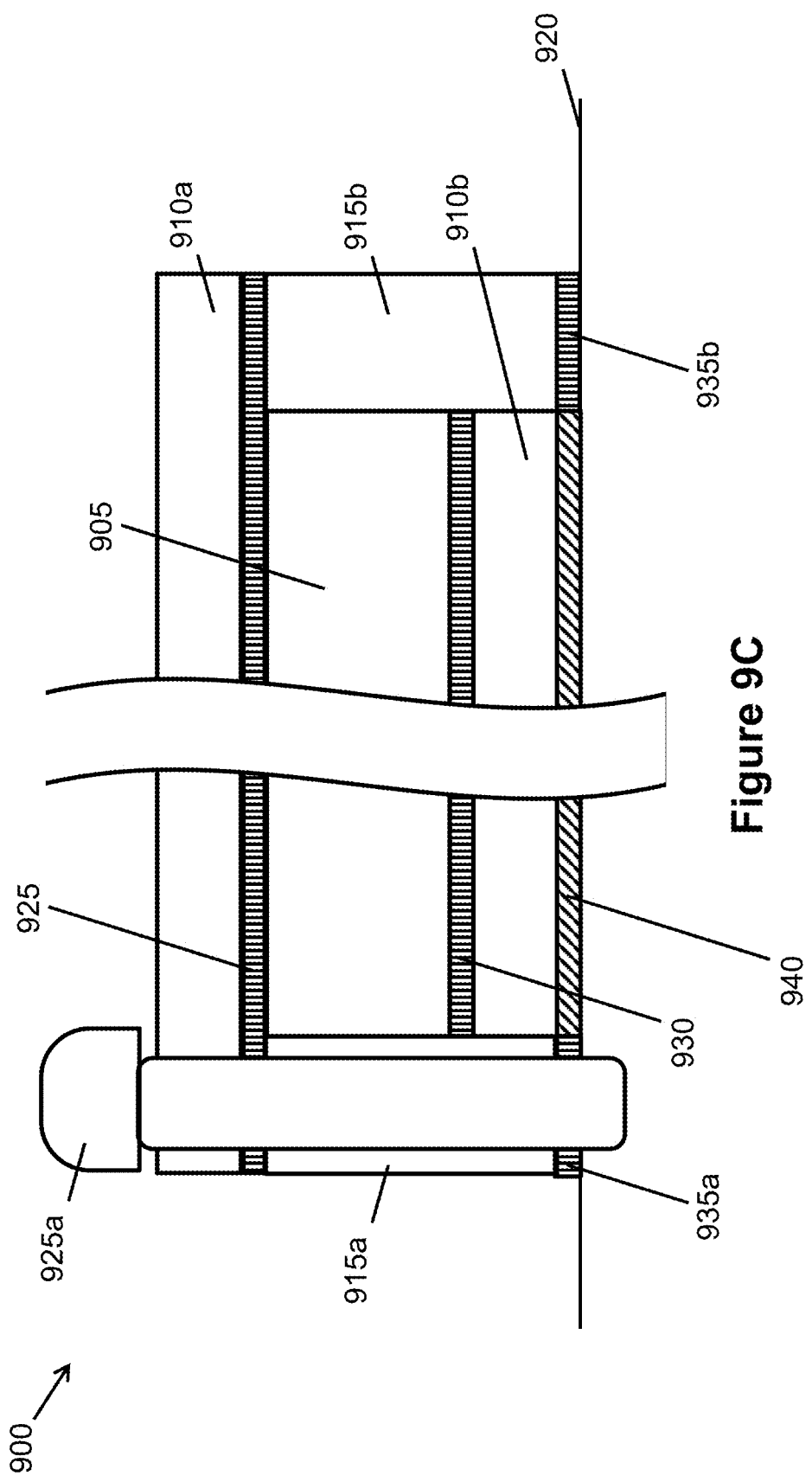
FIG. 9C is an enlarged view of certain elements of FIG. 9B.
Figure 9D:
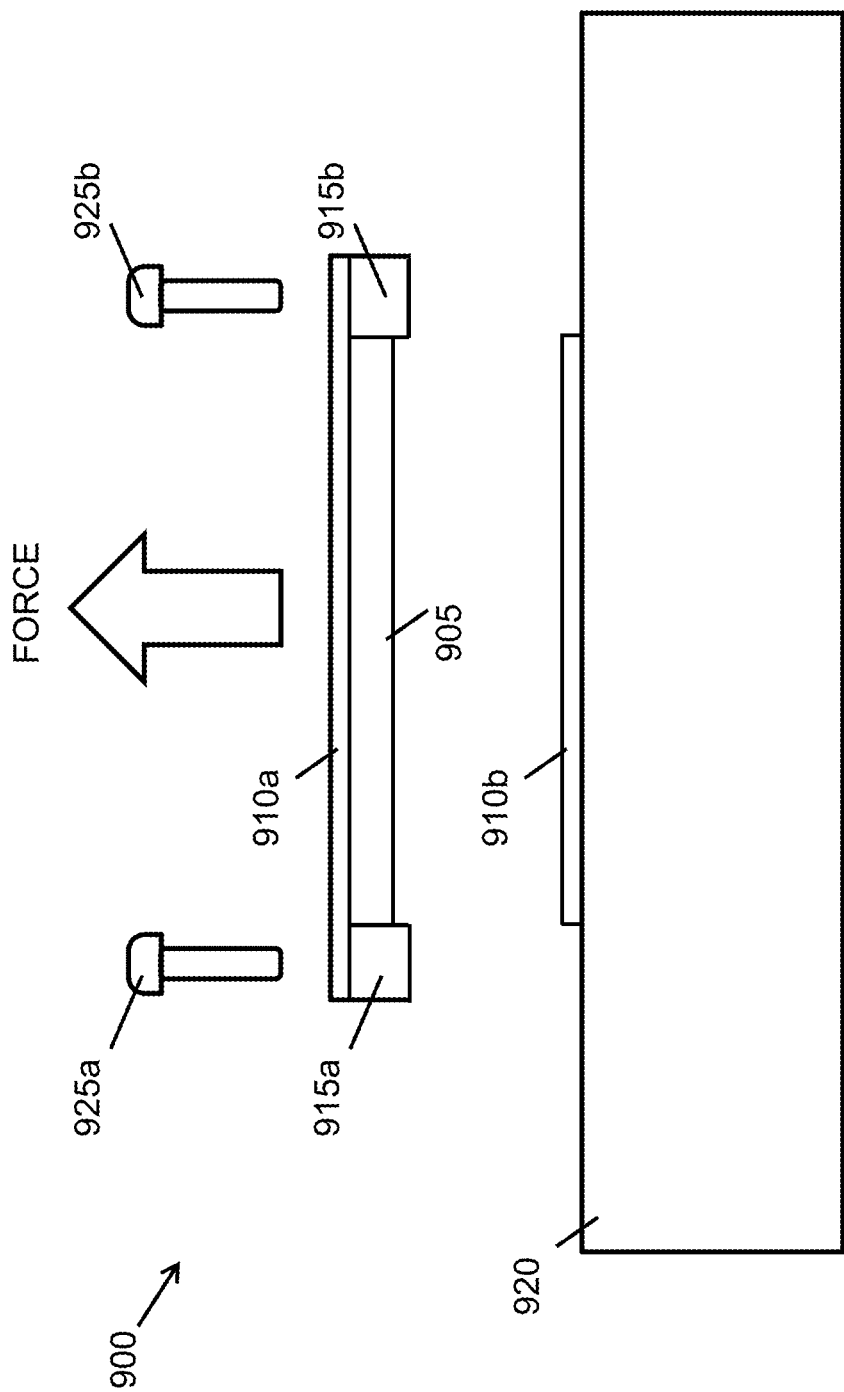
FIG. 9D is a schematic diagram of the tamper-proof payment instrument of FIG. 9B after tampering has been attempted.

Embodiments will now be described which relate to securing of the merchant payment instrument. FIGS. 9A to 9D show a tamper proof device for use in a transaction processing, and is preferably a tamper-proof merchant payment instrument 900. Payment instrument 900 is suitable for use in system 100 and in particular payment instrument 110 can be a tamper-proof merchant payment instrument like tamper-proof merchant payment instrument 900. As mentioned above, merchant payment instrument 110 may be secured directly on a surface of service dispensing device 115 using a securing means such as an adhesive. FIG. 9A shows payment instrument 900, FIG. 9B shows payment instrument 900 mounted to a mounting surface 920, FIG. 9C is an enlarged view of certain elements of payment instrument 900 and FIG. 9D shows payment instrument 900 after tampering has been attempted.

Payment instrument 900 includes an electronic component 905 which in the illustrated embodiment is a secure element smart card of the type known in the art. Other electronic components that securely and electronically store information such as a unique identifier associated with a merchant payment instrument (e.g. a PAN) can alternatively be used in place of a secure element smart card.

Electronic component 905 is housed in a housing formed of opposing protective membrane layers 910a, 910b and mounting blocks 915a, 915b. The housing serves to protect electronic component 905 from the surrounding environment. Mounting blocks 915a, 915b are configured to secure payment instrument 900 to a mounting surface 920 as shown in FIG. 9C. Mounting surface 920 is preferably a surface that is proximate service dispensing device 115. Mounting surface 920 may be an exterior surface of service dispensing device 115. It is preferable that mounting surface 920 is selected such that, when payment instrument 900 is mounted to mounting surface 920, payment instrument 900 is easily accessible to a user.

Protective membrane layers 910a, 910b are made of plastics material which may include PVC, polycarbonate, polyester, PET, PETF, PETG or composite. Other suitable materials for protective membrane layers 910a, 910b will become apparent to a skilled person having the benefit of the present disclosure.

Mounting blocks 915a, 915b are optional and can be made of suitable material such as plastics. Other suitable materials for mounting blocks 915a, 915b will become apparent to a skilled person having the benefit of the present disclosure.

Optionally, mounting screws 925a, 925b may be provided. Mounting screws 925a, 925b screw into a respective one of mounting blocks 915a, 915b as shown in FIG. 9B to secure payment instrument 900 to mounting surface 920. In the illustrated embodiment mounting screws 925a, 925b are plate screws but other types of screw can be used instead.

Regardless of whether or not mounting screws 925a, 925b are provided, payment instrument 900 is secured to mounting surface 920 using an adhesive layer placed on the bottom surface of each mounting block 915a, 915b (see FIG. 9C).

Referring here in particular to FIG. 9C which shows one embodiment of using different adhesives to provide protection, various adhesive layers are provided in payment instrument 900.

In FIG. 9C screw 925b is omitted in the interests of clarity. The adhesive layers shown in FIG. 9C with vertical shading are weak adhesive layers. Adhesive layers shown with oblique shading are strong adhesive layers. In the illustrated embodiment the weak adhesive is Removable PermaTack and the strong adhesive is Epoxy, Methacrylate or contact bond adhesive. Alternatives known to a skilled person can instead be used, providing that their use results in the arrangement shown in FIG. 9D and described below if a tampering attempt involving attempted removed of payment instrument 900 from mounting surface 920 is made. It will be appreciated that 'weak' and 'strong' are relative terms, and further that it is easier to separate entities that are secured together with a weak adhesive than it is to separate entities that are secured together with a strong adhesive.

A weak adhesive layer 925 is provided between protective membrane layer 910a and each of electronic component 905, mounting block 915a and mounting block 915b. Adhesive layer 925 thus weakly secures protective membrane layer 910a to electronic component 905, mounting block 915a and mounting block 915b. A similar weak adhesive layer 930 is provided between protective membrane layer 910b and electronic component 905, such that protective membrane layer 910b is weakly secured to electronic component 905.

A weak adhesive layer 935a is provided between mounting block 915a and mounting surface 920. A similar or identical weak adhesive layer 935b is provided between mounting block 935b and mounting surface 920. Mounting blocks 915a, 915b are thus each weakly secured to mounting surface 920. If present, screws 925a, 925b provide an additional securing mechanism that supplements adhesive layers 935a, 935b. It will be appreciated that, during a tampering attempt, screws 925a, 925b would be removed such that only adhesive layers 935a, 935b remained securing payment instrument 900 to mounting surface 920.

A strong adhesive layer 940 is provided between mounting surface 920 and protective membrane layer 910b such that protective membrane layer 910b is strongly secured to mounting surface 920.

In a tampering attempt, at some point it likely becomes necessary to remove payment instrument 900 from mounting surface 920. When removal is attempted, the result is as shown in FIG. 9D. Weak adhesive layer 930 gives before strong adhesive layer 940, meaning that protective membrane layer 910b separates from electronic component 905 and remains secured to mounting surface 920. Mounting blocks 915a, 915b are only weakly secured to mounting surface 920 (once screws 925a, 925b are removed, if present at all) via weak adhesive layers 935a, 935b. Mounting blocks 915a, 915b therefore separate from mounting layer 920 before protective membrane layer 910b which is strongly secured to mounting layer 120, resulting in the entire payment instrument 900 other than protective membrane layer 910b separating from mounting surface 920.

The separation of protective membrane layer 910b from electronic component 905 exposes electronic component 905. This exposure triggers the electronic component to self-destruct, e.g. triggering a short circuit that will burn out the electronic component—rendering payment instrument 900 unusable. As a result, the tampering attempt fails. Operation of system 100 can be restored by replacing the non-functioning payment instrument 900 with a functional replacement. Optionally a message such as 'tampered' may be provided on the upper surface of protective membrane 910b that is exposed once the rest of payment instrument 900 is removed, such that it is readily apparent to a user that payment instrument 900 has been tampered with. This is referred to in the industry as 'tamper evident'.

In another embodiment as shown in FIGS. 9E-9I, the different strength adhesives such as those used in the embodiment of FIG. 9A-9D are provided in different areas of the payment instrument 900 to cause a secure element chip 950 of the electronic component 905 to detach from the electronic component to which it is attached when tampering occurs and to remain attached to the protective membrane base layer 910b. In particular, relatively strong adhesive is used on the protective membrane base layer 910b only in the region which contacts the secure element chip 950 of the electronic component 905 and relative weak adhesive or no adhesive in the region between the secure element chip 950 and protective membrane cover layer 910a. This increases the pressure on the chip 950 when the electronic component 905 is pulled away from the surface it is mounted on and is a result of the electronic component 905 having only a relatively small region (i.e. the chip) that needs to be protected from tampering. Once the chip is detached from the electronic component (eg. card body), it will be rendered unusable based on conventional smart card tamper-proof technology (eg. chip disconnected from an antenna circuit on the card can cause the chip to be unusable).

Optionally a message such as 'tampered' may be provided on the upper surface of protective membrane 910b that is exposed once the rest of payment instrument 900 is removed, such that it is readily apparent to a user that payment instrument 900 has been tampered with.

Figure 9F:
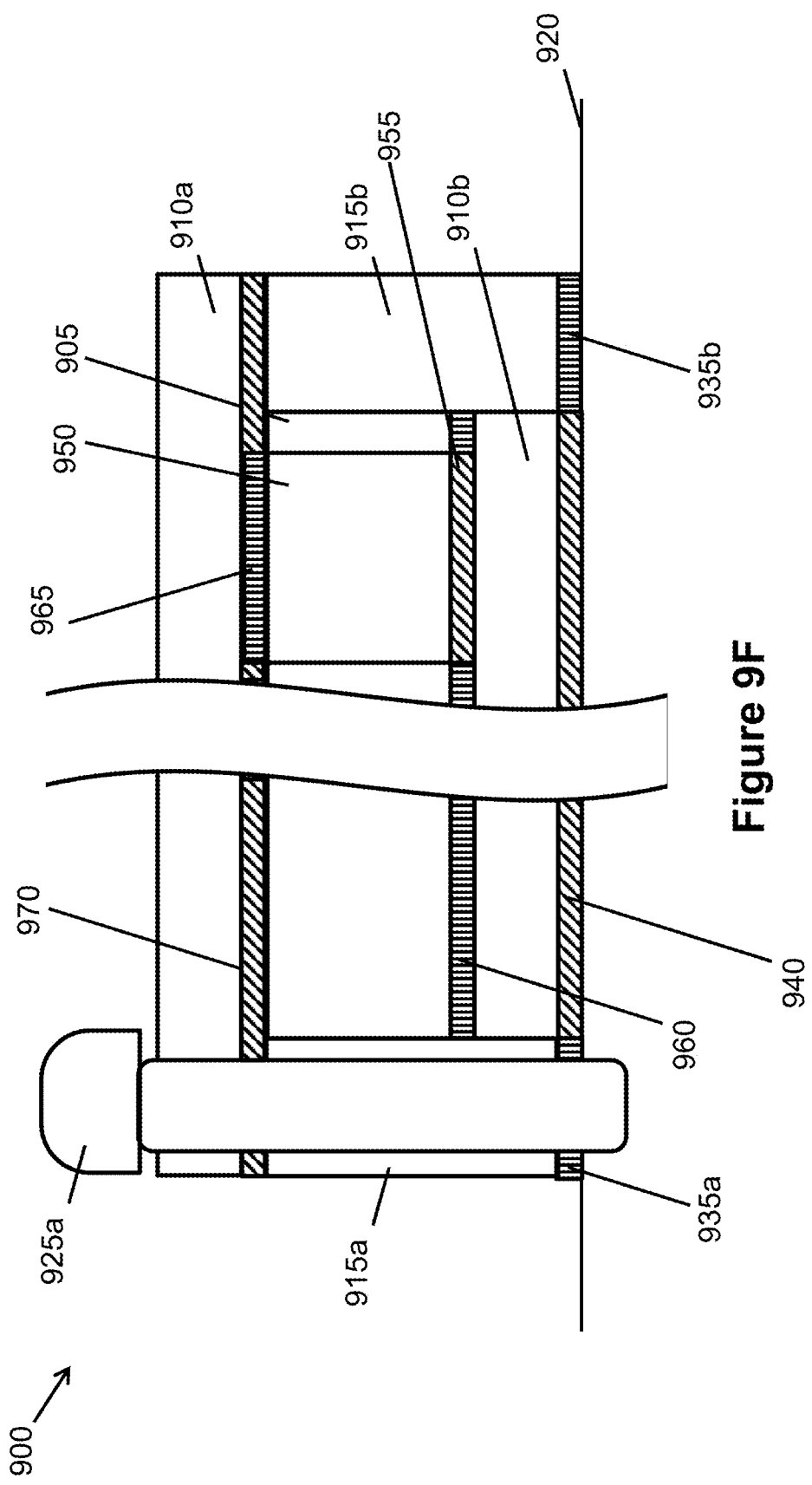
FIG. 9F is an enlarged view of certain elements of FIG. 9E.
Figure 9G:
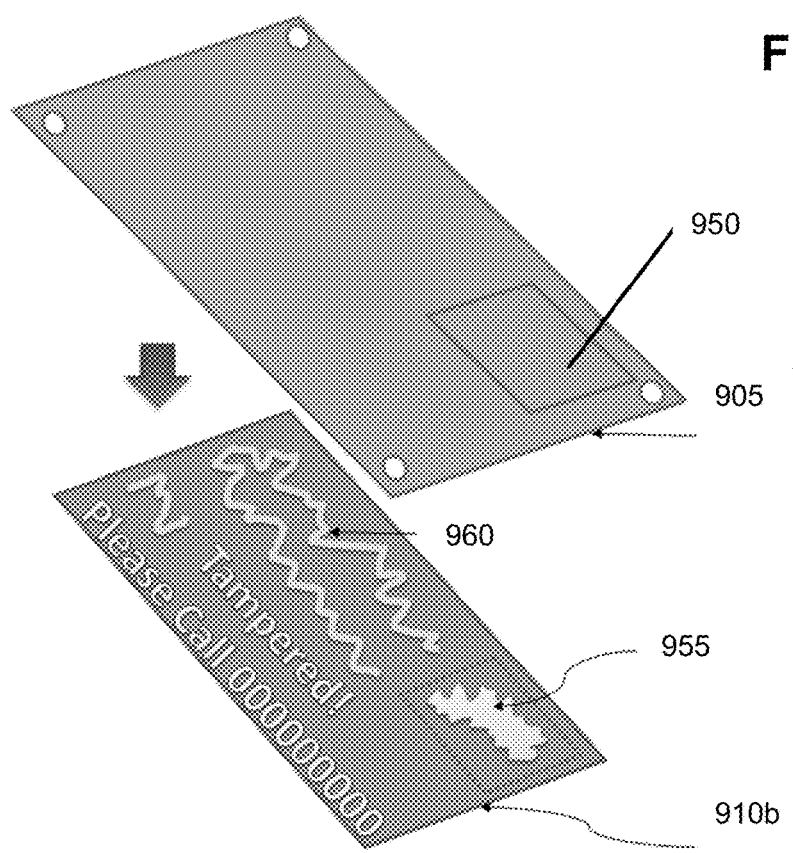
FIG. 9G is an exploded perspective view of part of the alternative tamper-proof payment instrument of FIG. 9E.
Figure 9H:
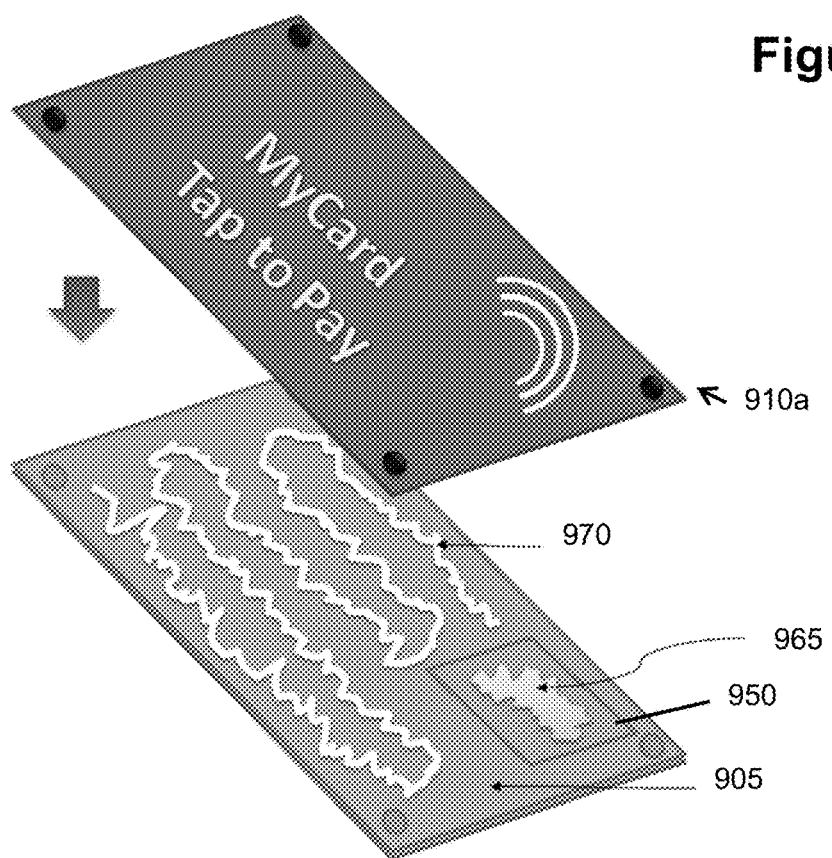
FIG. 9H is an exploded perspective view of another part of the alternative tamper-proof payment instrument of FIG. 9E.

As shown in more detail in FIG. 9F which is similar to FIG. 9C but with different strength adhesives being applied and the secure element chip 950 shown, the electronic component 905 with the secure element chip 950 is faced down towards an upper surface of the protective membrane base layer 910b (i.e. the surface of the electronic component 905 on which the secure element chip 950 is exposed faces the upper surface of the protective membrane base layer 910b) and the region of the electronic component 905 where the exposed secure element chip 950 is located is secured to the upper surface of the protective membrane 910b with a strong adhesive layer 955. Otherwise, a weak adhesive layer 960 is provided between protective membrane layer 910b and the remaining section of the electronic component 905 (i.e. the section that does not include the secure element chip 950). As with the adhesive layers in FIG. 9C, the oblique shading are strong adhesive layers. In the illustrated embodiment the weak adhesive is Removable PermaTack and the strong adhesive is Epoxy, Methacrylate or contact bond adhesive. Alternatives known to a skilled person can instead be used, providing that their use results in the arrangement shown in FIG. 9E and described below if a tampering attempt involving attempted removed of payment instrument 900 from mounting surface 920 is made As also shown in FIG. 9H, the opposing surface of the secure element chip region is secured to the lower surface of the upper protective membrane 910a with a weak adhesive layer 965, or with no adhesive at all. Otherwise, a strong adhesive layer 970 is provided between protective membrane layer 910*a* and the remaining section of the electronic component 905 to secure it to the protective membrane 910*a* (i.e. the section that does not include the secure element chip 950). The purpose of this configuration is to make sure that the body of the electronic component 905 remains connected to the top membrane 910*a* if the composite is removed from the base membrane 910*b*, but allow the chip to be torn from the electronic component 905 and remain attached to the base membrane 910*b*.

Each of the mounting blocks 915*a*, 915*b* are also secured to the protective membrane 910*a* with strong adhesive. It will be appreciated that mounting blocks 915*a*, 915*b* are optional features and if present can be weakly secured to mounting surface 920 (once screws 925*a*, 925*b* are removed, if present at all) via weak adhesive layers 935*a*, 935*b*.

Figure 9I:
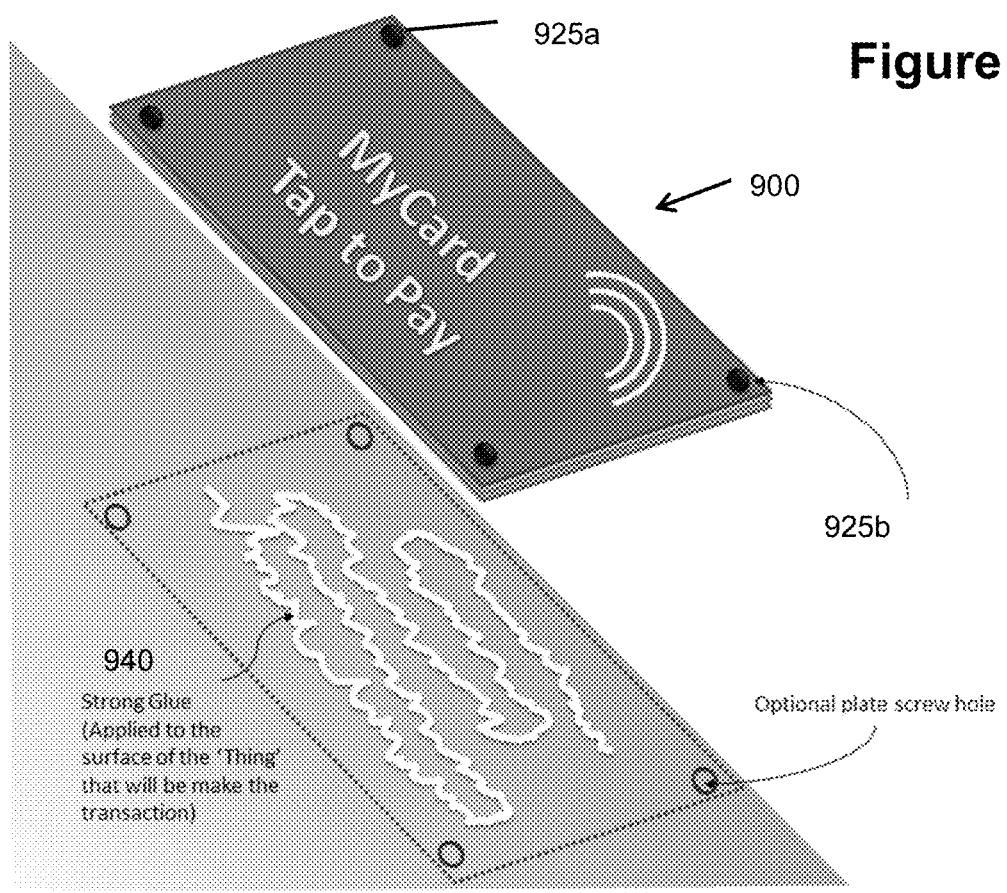
FIG. 9I is a perspective view of the alternative tamper-proof payment instrument of FIG. 9E before it is attached to a surface without screws or mounting blocks.

In each of the tamper protection embodiments and as shown in FIGS. 9F and 9I, the composite smartcard/payment instrument 900 are attached to the target object surface 920 using a strong adhesive 940 to make sure that the instrument 900 will break up before enough force is applied to remove it.

It will be appreciated that the tamper protection embodiments can create a composite entity with differing tolerances to force at the points of adhesive contact. The choice of adhesive combination will depend upon the materials used for the various membranes and the materials used in the manufacture of the electronic component used in the installation.

It will be appreciated that the form of payment instrument 900 can be modified in a number of ways without departing from the scope of the invention. For example, although payment instrument is shown as cuboidal, this is not essential and payment instrument can take any other shape known to the skilled person. A different number of mounting screws can be provided, such as one screw, three screws, four screws, etc. The location of the screws can also be varied. Other such modifications will become apparent to a skilled person having the benefit of the present disclosure.

Further, it will be appreciated that in some embodiments the payment instrument is a conventional contactless smartcard that can also act as an identity for the object that can be used in relation to transactions. Authentication of that identity may be performed using cryptographic key exchanges as are known in the conventional EMV standard.

Figure 10:
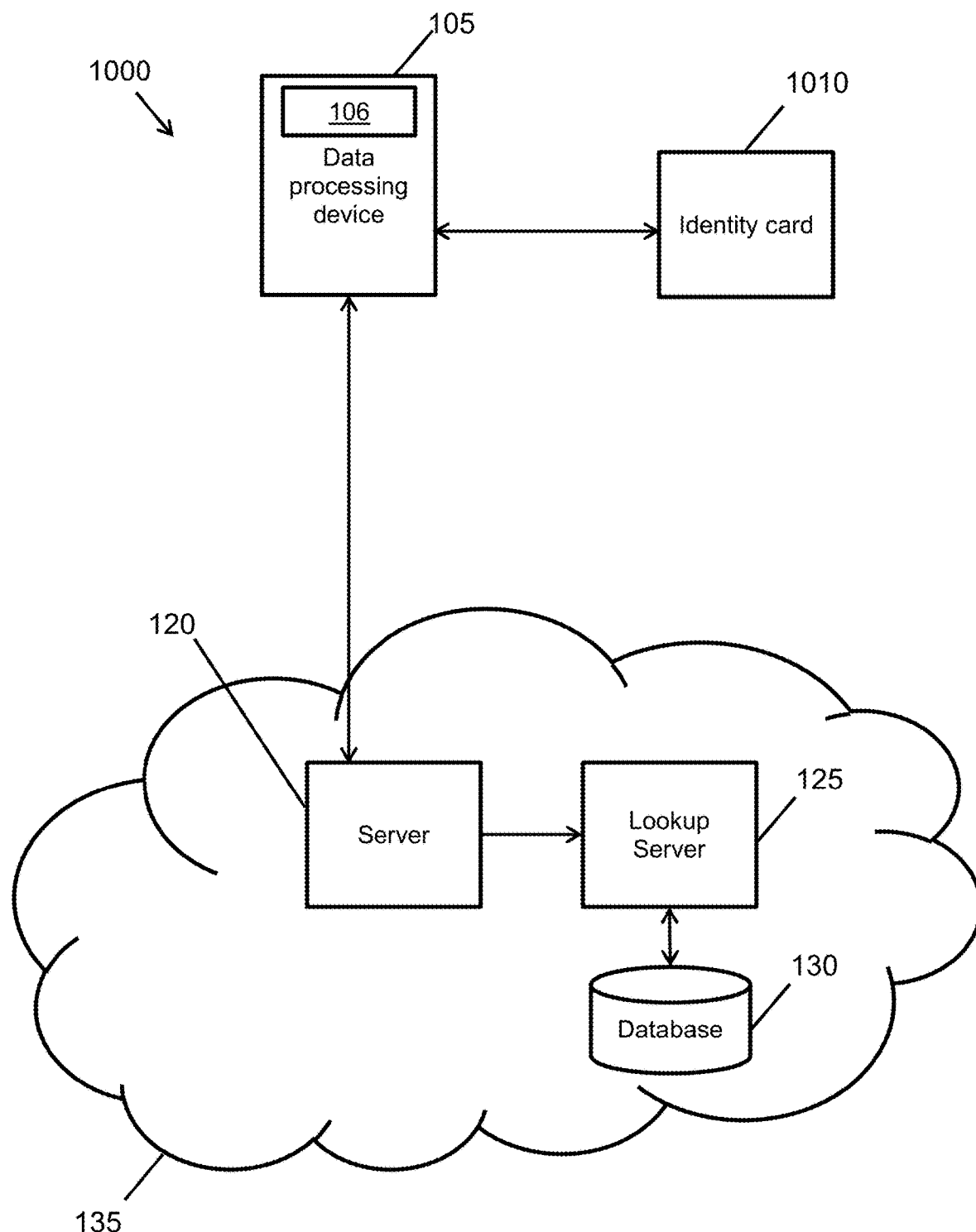
FIG. 10 is a schematic diagram showing a system according to another embodiment for identity checking.

Alternative embodiments to the service discovery aspect (FIGS. 6 and 7) are now described in FIG. 10. Similar reference numerals are used as in FIG. 1 for features capable of the same functionality as those in FIG. 1. In this embodiment, service discovery mode provides a mechanism for an identity check where the identity related to an electronic payment card is checked. This can be carried out independently of initiation of a payment that is described in the aforementioned embodiments, that is, without a payment transaction being initiated after an identity check.

FIG. 10 shows a system 1000 according to an embodiment. System 1000 includes a data processing device 105, an identity card 110 which is preferably an electronic payment instrument or card as described above but may be any type of mechanism that stores personal identity information and can be interrogated using a reader in a non-contact manner such as via radio frequency identification or NFC, or in a contact manner by extracting information, for example, when the card is inserted into the reader. It may be a merchant payment instrument that is already described above in relation to FIGS. 6 and 7. The identity card is typically already registered with the system or specially provisioned for the purpose of identification. The system further comprises a server 120, a lookup server 125 and a database 130. Server 120, lookup server 125 and database 130 are provided in Cloud 135 and could also be provided in a more traditional data centre or other typical server hosting arrangement.

In the interests of clarity of understanding only a single data processing device, and identity card are shown in FIG. 10. It will however be appreciated that the invention is not limited to this and that system 1000 may include one or more data processing devices like data processing device 105, and one or more identity cards like identity card 1010. In a practical implementation there may be thousands, hundreds of thousands or even millions of data processing devices, and/or merchant payment instruments.

Data processing device 105 is configured to function as an identity checking device and is preferably a payment acquiring device that can read data from the identity card 1010. By this it is meant that data processing device 105 is configured such that a user can use it to trigger a an identity check of the identity card and determine the result of the identity check. In the illustrated embodiment, data processing device 105 is a mobile telephone that has been configured to act as a secure data entry device, and preferably as a level 2 EMV terminal of the type well known in the art. This can be achieved by connecting data processing device 105 to an external card reading module (not shown) that facilitates the taking of an electronic payment. One example of a suitable external card reading module is provided by the Applicant under the name 'Worldpay Total Mobile Device'. Another example of a suitable module is provided by the Applicant under the name 'Worldpay Zinc'. A software application may be installed on data processing device 105 to facilitate control of the external card reading module. Alternatively, data processing device 105 may include the necessary hardware and/or software to trigger a payment and determine the result of the payment itself, such that no external card reading module is needed.

It will be appreciated that data processing device does not have to be a mobile telephone and can alternatively be any electronic device that is capable of being configured to function as a user payment acquiring device. For example, data processing device 105 could alternatively be a tablet computer, a Pin Entry Device (PED), a laptop computer, a Personal Digital Assistant, etc. Preferably data processing device 105 is a user device in the sense that it is provided by the user as opposed to a merchant. A user device may be owned by the user.

As shown in FIG. 1, data processing device 105 is configured to communicate with the identity card 1010. In the illustrated embodiment both data processing device 105 and identity card 1010 are configured for short-range communication, and in particular Near Field Communication (NFC) as is known in the art. Other short-range communication technologies such as Bluetooth, RFID, WiFi, Bluetooth Low Energy, magnetic transmissions, sound modulation, light or colour transmission, etc. can alternatively be used. However, identity card 1010 may also be received within the body of the data processing device 105 to read the card.

Data processing device 105 is configured to display only for a short time after identity card 1010 is in contact with (i.e. close enough to be read in a non-contact manner through NFC or present in) the data processing device 105, information relating to the identity card. The information could relate to the identity of the registered card owner and/or to a service being offered by card owner. Once the identity card 1010 is removed from the device 105 (contactless card moved out of NFC/Bluetooth field or the card removed from device), the display of information is terminated.

The data processing device 105 comprises a display screen 106 which is preferably a trusted display in the sense that it comprises mechanisms to separate hardware from the standard device Operating System that is vulnerable to security attacks.

Where the identity card 1010 is an electronic payment card, it may be linked with a payment account associated with the identity card owner. The identity card 1010 has an associated unique identifier that allows a specific payment card within a set of payment cards to be unambiguously identified. In the illustrated embodiment the unique identifier is a Primary Account Number (PAN') which typically takes the form of a sixteen digit number as known in the art. However, other unique identifiers such as a Payment Account Reference (PAR') can alternatively be used.

Identity card 1010 is also configured to transmit an identification data package to data processing device 105 in response to receipt of an identity card read request from data processing device 105. Further details relating to this are provided later in this specification.

Limiting the display of the ID on the display screen 106 is to prevent the identity checking user of the data processing device 105 from storing identity information of the identity card owner being checked for purposes outside the scope of the service and to keep the checked person's details private. As this identity checking service is carried out in a face-to-face environment with the identity card holder keeping hold of their card it is brought into the field of the identity checking data processing device 105, this can help in limiting the potential fraud opportunities.

Any use of the identification checking service will be logged with date, time, location, checking user and identified user. This will allow delivery tracking and auditing to take place. This identity checking data may also be used for risk analysis to be carried out which may include velocity checks and statistics on mismatched identities.

Furthermore, in the embodiment where the identity card 1010 is a conventional electronic payment card embedded with EMV security, by having the recognised EMV security on the payment card, this is an advantageous mechanism to prove that a person is in receipt of a payment mechanism that was activated by an official issuing authority.

Server 120 is configured to provide an identity checking service and may also provide a payment acquiring and initiation service as is known in the art (and described in relation to FIG. 1). Server 120 is communicatively coupled to data processing device 105 via a communication link. The communication link can be any link known in the art suitable for communication with an entity within a Cloud like Cloud 135. In the illustrated embodiment the communication link is an internet-protocol link for communication across the internet as well known in the art. Many other suitable alternatives for the communication link will be apparent to a skilled person having the benefit of the present specification. Server 120 is configured to receive an identity request data package from data processing device 105, to process the identity request data package, and return registered identity card owner information including an image and/or one or more parameters associated with the identity card owner (such as name, address, telephone number, license number, passport number, state ID, national insurance number) to the data processing device 105.

Server 120 may be communicatively coupled to lookup server 125 and lookup server 125 may be communicatively coupled to database 130. The coupling may be achieved by any suitable communication link known to the skilled person, e.g. an internet-protocol link. Although the server 120, lookup server 125 and database 130 are shown as distinct entities, it will be appreciated that they may be combined into a single entity such that the server will have all the capabilities of the lookup server 125 and the database 130.

Server 120 is configured to transmit a lookup request to lookup server 125 based on the identity request data package. Lookup server 125 is configured to receive a lookup request from server 120 and to process the lookup request by performing a lookup operation on database 130. Database 130 stores a list of unique identifiers for all identity cards that have been issued by a relevant issuing authority. In the illustrated embodiment database 130 stores a list of PANs, one for each electronic payment card. The database 130 may additionally store information relating to the assigned card owner. This information includes one or more of: an image of the owner, name, address, telephone number, license number, passport number, state ID, national insurance number.

The identity checking service is therefore a look-up system that can identity information such as an image of a registered card holder, and associated personal information (name, address etc). The information requested is retrieved from the database 130 when an identity card 1010 of the payment card holder is presented via Near Field Communication. This information is also displayed on the checker's device through a dedicated application to reduce the chance of the subject being able to hack the system with fake identity information.

Figure 11:
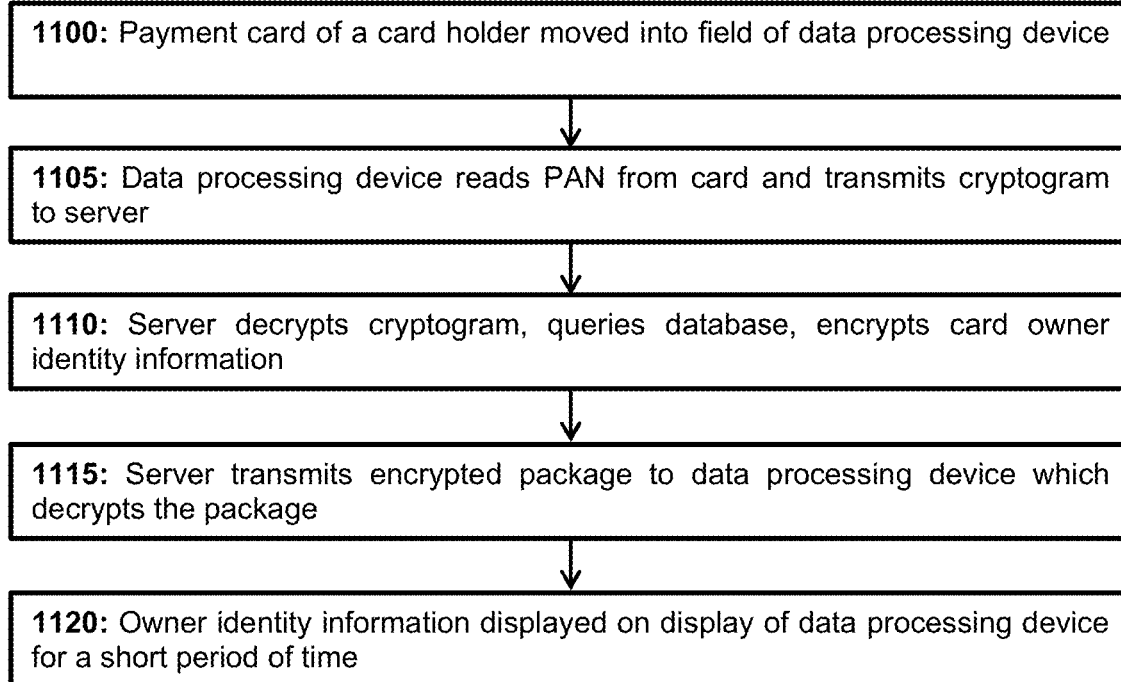
FIG. 11 is a flow diagram showing operation of the system of FIG. 10 in an information request mode.

Referring now to FIG. 11, the operation of the system 1000 is described in an embodiment where the identity card is a contactless EMV payment card. Identity checking mode provides a mechanism for checking information relating to an interrogated identity card which can be a conventional contactless electronic smart card including EMV security (i.e. a contactless EMV payment card). It will be appreciated by the skilled person that this is similar to the service discovery of FIGS. 6 and 7 although in this case an identity of a user is being checked rather than obtaining information of a service associated with a merchant payment instrument. Furthermore, as identity information is being transmitted, cryptographic methods such as asymmetric cryptography can be used to provide improved security.

In step 1100, the contactless EMV payment card (a type of identity card 1010) of a card holder is brought proximate the data processing device 105 such that a transient short-range communication link is enabled between these devices. That is, the payment card is received in the short-range communication field such as a near field communication (NFC) field of the data processing device 105. It will be appreciated that the payment card may be a virtual payment card that has been stored ('provisioned') on an electronic device such as a mobile telephone, or a wearable or other form factor, as is known in the art. The movement into the field may occur after the data processing device 105 has been switched to an identity checking and/or service discovery mode. Instead of bringing the payment card into close proximity such that it is in short-range communication, it may be brought into close proximity in the sense of being input into the data processing device 105 through an opening in the data processing device 105 such that it is partially contained within the data processing device 105 (similar to a card being received in a slot of a conventional chip and PIN terminal).

In step 1105, the data processing device 105 will read a unique identifier which in this embodiment is the PAN from the payment card, encrypt the information using a public key of the identity checking server 120, and send this information over a secure connection to the server 120 which is part of the identity checking service. A public cryptographic key of the data processing device 105 will also be sent to the server 120 so the response from the server 120 can be encrypted specifically for the data processing device 105 to decrypt using its private key within a secure processing environment, such as a Secure Element (SE) or a Trusted Execution Environment (TEE). The information relating to the PAN and the data processing device public key may be packaged and sent as an identity request data package in the form of a cryptogram.

In step 1110, the server 120 will decrypt the cryptogram using its private key that is paired with the data processing device's public key and query information relating to the received PAN in the database 130. On the basis that the PAN is present in the database, the query provides the identity information relating to the identity of the registered payment card owner that is associated with the received PAN. The card owner information includes an image and/or one or more parameters associated with the identity card owner (such as name, address, telephone number, license number, passport number, state ID, national insurance number). The card owner information is packaged into an encrypted package using the public key received from the data processing device 105. Other types of encryption methods known in the art such as that used in digital rights management (DRM) system may be used.

In step 1115, the encrypted package is transmitted back to the data processing device 105 where it is decrypted using the private key associated with the public key which formed part of the cryptogram sent to the server 120. The decryption preferably occurs in a secure environment on the data processing device to prevent a rogue user and/or malware from accessing it. This can be under a system-on-chip playback system such as Trusted Execution Environment—Trusted User Interface (known in the art) or by implementing Protected Execution with a Secure Content Path (SCP). These technologies can prevent a rogue user of the application from being able to take screen shots of the information while the information is displayed on the data processing device in the same way that these systems currently protect against piracy of content.

In step 1120, the card owner information is displayed on the display 106 of the data processing device 105 for a short period of time. This may be the period of time that the payment card is directly communicating with the data processing device eg. only show the card owner information while the payment card is within the NFC field of the data processing device 105 or within the data processing device 105. As mentioned above, a secure environment is provided such that the display is a trusted display in the sense that whilst in identity checking mode, the display is controlled by a separate sandboxed system rather than the native operating system of the data processing device 105 so screen capture mechanisms or other information capturing mechanisms normally associated with the native operating system are disabled. Other related hardware may also be separated from the native operating system to avoid the display being compromised.

The person in current control of the data processing device 105 can compare the image revealed on the data processing device 105 (e.g. their mobile phone) to the face of the person that provided the payment card. This can be useful in the delivery of goods, for example, where a deliverer of goods (as an identity checker) may want to check the identity of a person with the payment card.

The card can be shown and the deliverer can make the comparison of the image and the person to ensure that the card is not stolen. The image of the person disappears from the data processing device 105 when the payment card is moved out of the communication field of the data processing device or removed from the data processing device. Therefore, an electronic identity reveal mechanism is provided which can make use of the security provided by EMV and a secure environment on the data processing device.

As an alternative, automated checking could be used. The identity checker captures an image of the person to be checked using the data processing device 105 which is provided with an image capture device (not shown). This image is temporarily held on the on the data processing device 105. When the payment card of the person being checked is scanned on the data processing device 105 (the payment mechanism enters the NFC field, or a card is inserted into a payment card chip reader), the biometric of the image of the person being checked is encrypted and sent to the server 120, along with the PAN (as described in relation to step 1105 of FIG. 11). The server 120 will then check that the capture image matches the one stored in the secure database 130, at the same time as looking up the personal information. If the image does not match, then the system will recommend not transferring the goods or service to the person being checked and will not return any personal information about the person being checked. Other face recognition solutions could be implemented in this system.

It will be appreciated that the aforementioned identity checking process may be combined with the aforementioned service discovery process, where the identity of a merchant representative that has a merchant payment instrument is to be checked, by combining certain steps of FIG. 11 with the equivalent steps in FIG. 6. That is, the merchant payment instrument 110 of the system in FIG. 1 and described in relation to FIGS. 6 and 7 could be associated with a person rather than a service dispensing device 115. The data package that is received by the data processing device 105 from the server 120 could include combined information relating to the service offered by the person associated with the merchant payment instrument and the identity of the person associated with the merchant payment instrument. In one example, where the person is a representative of a charity, the process could reveal a photograph of the representative and the name of the representative. Where the combined identity check and service discovery is used, moving the card out of the NFC field of the data processing device 105 may remove the sensitive identity information from the display 106 but messages relating to the service discovery aspect may remain for a short period of time after the data processing device and payment instrument are separated to allow a user to read the message and select any options related to the service information and initiate a payment as described in connection with FIG. 2.

Numerous modifications, adaptations and variations to the embodiments described herein will become apparent to a person skilled in the art having the benefit of the present disclosure, and such modifications, adaptations and variations that result in additional embodiments of the present invention are also within the scope of the accompanying claims.

In addition to the embodiments described previously and claimed in the appended claims, the following is a list of embodiments, which refer to features of existing claims and/or may serve as the basis for additional claims in this application or subsequent divisional applications.

EMBODIMENTS

In a first embodiment, an electronic payment system, comprises: a data processing device that is communicatively coupleable via a first communication link to a payment instrument that is configured to approve only negative value payment requests and/or zero value payment requests, the data processing device communicatively coupleable to a server via a second communication link; and a service dispensing device that is communicatively coupleable to the server via a third communication link; wherein the data processing device configured to: receive a first input including at least a payment amount; transmit a payment request to the payment instrument, the payment request including at least the payment amount; receive a first data package generated by the payment instrument, the first data package based on the payment request; generate a transaction request data package based on the first data package; and transmit the transaction request data package to the server; wherein the data processing device and/or the server is configured to determine whether to approve or decline a transaction, and in the event the transaction is approved, the server is configured to generate a trusted data package based on the transaction request data package and transmit the trusted data package to the service dispensing device; and wherein the service dispensing device is configured to: receive the trusted data package from the server; determine the authenticity of the trusted data package; and in the event the trusted data package is determined to be authentic, provide one or more services.

A second embodiment can include the system of Embodiment 1, wherein the payment instrument is configured to approve only negative or zero value payment requests and wherein the first data package is generated based on a negative or zero value payment request.

A third embodiment can include the system of Embodiment 1 or Embodiment 2, wherein the payment instrument is located proximate the service dispensing device.

A fourth embodiment can include the system of Embodiment 3, wherein the payment instrument is secured to a surface of the service dispensing device.

A fifth embodiment can include the system of any preceding Embodiment, wherein the server is configured to determine whether to approve or decline a transaction based on the transaction request data package.

A sixth embodiment can include the system of any preceding Embodiment, wherein the trusted data package includes at least a set of instructions that specify at least one parameter relating to the one or more services.

A seventh embodiment can include the system of any preceding Embodiment, wherein the first data package includes at least a unique identifier associated with the payment instrument, and wherein the transaction request data package also includes the unique identifier.

An eighth embodiment can include the system of Embodiment 7, wherein the unique identifier is one of a PAN associated with the payment instrument and a tokenised PAN associated with the payment instrument.

A ninth embodiment can include the system of Embodiment 7 or Embodiment 8, further comprising a database communicatively coupled to the server, and wherein the server is further configured to:
generate a lookup request based on the unique identifier; query the database using the lookup request; and receive a response from the database, the response indicating whether the unique identifier was found in the database; wherein the server generates the trusted data package only in the event that the response indicates that the unique identifier was found in the database.

A tenth embodiment can include the system of Embodiment 9, wherein the server declines the transaction in the event that the response indicates that the unique identifier was not found in the database.

An eleventh embodiment can include the system of any preceding Embodiment, wherein the server is further configured to encrypt and sign the trusted data package and to transmit the encrypted signed trusted data package to the service dispensing device.

A twelfth embodiment can include the system of Embodiment 11, wherein the service dispensing device is configured to: attempt decryption and digital signature checking of the encrypted trusted data package; and determine the encrypted trusted data package including digital signature to be authentic upon successful decryption of the encrypted trusted data package.

A thirteenth embodiment can include the system of any one of Embodiments 1 to 11, wherein the service dispensing device is configured to determine whether the trusted data package contains an authorisation message from the server and, in the affirmative, determine the signed trusted data package to be authentic.

A fourteenth embodiment can include the system of any preceding Embodiment, wherein the payment request includes at least an electronic cryptogram and an at least an amount that is to be paid, wherein the amount is a negative amount or zero.

A fifteenth embodiment can include the system of Embodiment 14, wherein the transaction request data package includes at least some data contained in the first data package.

A sixteenth embodiment can include the system of Embodiment 15, wherein the transaction request data package further includes information identifying a user of the system.

A seventeenth embodiment can include the system of Embodiment 15 or Embodiment 16, wherein the server is configured to decrypt the electronic cryptogram; the server further configured to:
approve the transaction if decryption is successful; and decline the transaction if decryption is unsuccessful.

An eighteenth embodiment can include the system of any preceding Embodiment, wherein the first input is manual input to the data processing device.

A nineteenth embodiment can include the system of any one of Embodiments 1 to 17, wherein the data processing device is further configured to: transmit a read request to the payment instrument, the read request indicating that the data processing device requires information relating to a service associated with the payment instrument; receive an identification data package from the payment instrument; transmit a service information request to the server, the service information request based on the identification package; receive service information from the server, the service information including a cost of the service; and update a user interface of the data processing device with at least the cost of the service.

A twentieth embodiment can include the system of Embodiment 19, wherein the data processing device is further configured to use the cost of the service as the first input.

A twenty-first embodiment can include the The system of Embodiment 19 or Embodiment 20, wherein the identification data package includes at least a unique identifier associated with the payment instrument.

A twenty-second embodiment can include the system of Embodiment 21, wherein the service information request includes at least the unique identifier associated with the payment instrument.

A twenty-third embodiment can include the system of Embodiment 22, wherein the server is configured to: generate a lookup request based on the unique identifier; query a database using the lookup request; and receive a response from the database, the response indicating whether the unique identifier was found in the database and, in the affirmative, including at least one of information relating to the service that the payment instrument is associated with and a link to a repository containing information relating to the service that the payment instrument is associated with; and transmit service information to the data processing device, the service information based on the response from the database.

A twenty-fourth embodiment can include the system of any preceding Embodiment, wherein the first communication link is a short-range communication link.

A twenty-fifth embodiment can include the system of Embodiment 24, wherein the first communication link is one of a WiFi, Bluetooth and Near Field Communication link.

A twenty-sixth embodiment can include the system of any preceding Embodiment, wherein the second and third communication links are each packet switched and/or circuit switched networks.

A twenty-seventh embodiment can include the system of any preceding Embodiment, wherein the service dispensing device is further configured to transmit an acknowledgement message to the server in the event that the service dispensing device provided one or more services, and wherein the server is further configured to transmit an approval message to the data processing device, the approval message based on the acknowledgement message.

A twenty-eighth embodiment can include the system of Embodiment 27, wherein the acknowledgement message and the approval message both include a signed encrypted digital file that is decryptable and passes signature verification by the data processing device, the encrypted digital file generated by the service dispensing device.

In an twenty-ninth embodiment, a method for processing an electronic payment, comprising: receiving, at a data processing device, a first input including at least a payment amount; transmitting a payment request from a data processing device to a payment instrument configured to approve only negative value payment requests and/or zero value payment requests, the payment request including at least the payment amount; receiving a first data package generated by the payment instrument, the first data package based on the payment request; generating a transaction request data package based on the first data package; transmitting the transaction request data package to a server; determining, whether to approve or decline the transaction; and, in the event the transaction is approved: generating, at the server, a trusted data package based on the transaction request data package; transmitting the trusted data package to a service dispensing device; determining, at the service dispensing device, the authenticity of the trusted data package; and in the event that the trusted data package is determined to be authentic, providing one or more services at the service dispensing device.

A thirtieth embodiment can include the method of Embodiment 29, wherein the payment instrument is configured to approve only negative or zero value payment requests and wherein the first data package is generated based on a negative or zero value payment request.

A thirty-first embodiment can include the method of Embodiment 29 or 30, wherein the server is configured to determine whether to approve or decline a transaction based on the transaction request data package.

A thirty-second embodiment can include the method of Embodiments 29, 30 or 31, wherein the trusted data package includes at least a set of instructions that specify at least one parameter relating to the one or more services.

A thirty-third embodiment can include the method of any one of Embodiments 29 to 32, wherein the first data package includes at least a unique identifier associated with the payment instrument, and wherein the transaction request data package also includes the unique identifier.

A thirty-fourth embodiment can include the method of Embodiment 33, wherein the unique identifier is one of a PAN associated with the payment instrument and a tokenised PAN associated with the payment instrument.

A thirty-fifth embodiment can include the method of Embodiment 33 or 34, further comprising: generating, at the server, a lookup request based on the unique identifier; querying a database using the lookup request; and receiving a response from the database, the response indicating whether the unique identifier was found in the database; wherein the trusted data package is generated only in the event that the response indicates that the unique identifier was found in the database, and in the event that the response indicates that the unique identifier was not found in the database, the transaction is declined.

A thirty-sixth embodiment can include the method of any one of Embodiments 29 to 35, wherein transmitting the trusted data package to a service dispensing device comprises: encrypting, at the server, the trusted data package to generate an encrypted signed trusted data package; and transmitting the encrypted trusted data package to the service dispensing device.

A thirty-seventh embodiment can include the method of Embodiment 36, wherein determining, at the service dispensing device, the authenticity of the trusted data package comprises: attempting to decrypt and check the signature in the encrypted trusted data package; and determining the signed encrypted trusted data package to be authentic upon successful decryption and signature check of the encrypted trusted data package A thirty-eighth embodiment can include the method of any one of Embodiments 30 to 36, wherein determining, at the service dispensing device, the authenticity of the trusted data package comprises: determining whether the trusted data package contains an authorisation message from the server and, in the affirmative, determine the trusted data package to be authentic.

A thirty-ninth embodiment can include the method of any one of Embodiments 30 to 38, further comprising: transmitting a read request from the data processing device to the payment instrument, the read request indicating that the data processing device requires information relating to a service associated with the payment instrument; receiving, at the data processing device, an identification data package from the payment instrument; transmitting a service information request from the data processing device to the server, the service information request based on the identification package; receiving, at the data processing device, service information from the server, the service information including a cost of the service; and updating a user interface of the data processing device with at least the cost of the service.

A fortieth embodiment can include the method of Embodiment 39, further comprising providing the cost of the service as the first input.

A forty-first embodiment can include the method of Embodiment 39 or Embodiment 40, wherein the identification data package and the service information request each include at least a unique identifier associated with the payment instrument, the method further comprising: generating, at the server, a lookup request based on the unique identifier; querying a database using the lookup request; and receiving a response from the database, the response indicating whether the unique identifier was found in the database and, in the affirmative, including at least one of information relating to the service that the payment instrument is associated with and a link to a repository containing information relating to the service that the payment instrument is associated with; and transmitting service information from the server to the data processing device, the service information based on the response from the database.

In a forty-second embodiment a tamper-proof transaction processing device for use in a transaction processing system, the device comprising: a housing comprising at least a first and second protective layer; an electronic component that is housed by the housing, the component comprising a secure element chip storing unique information relating to the chip; wherein the electronic component is located between the first and second protective layer, the device further comprising at least two different strength adhesives to secure different parts of the device together.

A forty-third embodiment can include the device of Embodiment 42, wherein the chip is provided in a first region of the component, and a relatively strong adhesive is used to secure at least part of the chip to at least part of the first protective layer and a relatively weak or no adhesive is used to secure at least part of the first region of the chip to at least part of the second protective layer, such that detachment of the electronic component from the device through the application of a force in a direction away from the first protective layer causes the chip to remain attached to the first protective layer.

A forty-fourth embodiment can include the device of Embodiment 42 or 43 wherein the first protective layer is securable to a surface of service dispensing device using a relatively strong adhesive.

A forty-fifth embodiment can include the device of Embodiment 43 wherein a relatively weak adhesive is used to secure at least part of a region outside the first region of the electronic component to the first protective layer.

A forty-sixth embodiment can include the device of Embodiment 45 wherein a relatively strong adhesive is used to secure at least part of the region outside the first region of the electronic component to the second protective layer.

A forty-seventh embodiment can include the device of any of Embodiments 42 to 46 wherein a top surface of the first protective layer includes indicia that tampering of the device has occurred.

A forty-eighth embodiment can include the device of any of Embodiments 42 to 47 wherein the component is a contactless EMV smart card.

A forty-ninth embodiment can include the device of any of Embodiments 43 to 48 wherein the relatively strong adhesive is Epoxy, Methacrylate or contact bond adhesive, and/or the relatively weak adhesive is removable PermaTack.

A fiftieth embodiment can include the An identity card checking system comprising: a data processing device that is communicatively coupleable to a payment instrument, the data processing device communicatively coupleable to a server via a second communication link, wherein the data processing device is configured to: initiate identity checking when the payment instrument is brought into close proximity of the data processing device to communicatively couple with the payment instrument; display identity information of the payment instrument registered owner on a display of the data processing device only while the payment instrument and data processing device are in close proximity, and to remove the identity information of the payment card owner from the display when the payment instrument and data processing device are not in close proximity.

A fifty-first embodiment can include the system of Embodiment 50, wherein the identity information includes an image of the payment instrument registered owner.

A fifty-second embodiment can include the system of Embodiment 50 or 51 wherein the data processing device is operable to: receive a first data package generated by the payment instrument; generate an identity request data package based on the first data package; and transmit the identity request data package to a server; wherein the first data package includes at least a unique identifier associated with the payment instrument, and wherein the identity request data package also includes the unique identifier.

A fifty-third embodiment can include the system of Embodiment 52, wherein the unique identifier is one of a PAN associated with the payment instrument and a tokenised PAN associated with the payment instrument.

A fifty-fourth embodiment can include the system of any of Embodiments 50-53 wherein the data processing device is further configured to: transmit a read request to the payment instrument, the read request indicating that the data processing device requires information relating to the identity of a user of the payment instrument; receive the identification information from the server, the identification information including an image of a registered user of the payment instrument; and update the display of the data processing device with at least an image of a registered user of the payment instrument if the payment instrument and data processing device are communicatively coupled.

A fifty-fifth embodiment can include the system of any of Embodiments 52-54, wherein the identity request data package includes an encrypted first data package encrypted using the server's public key prior, and includes the data processing device's public key.

A fifty-sixth embodiment can include the system of Embodiment 55, wherein the server is configured to: decrypt the identity request data package using its private key paired with the public key used to encrypt the first data package; obtain payment instrument owner information based on the information in the first data package; encrypt the payment instrument owner identification information using the data processing device's public key; and transmit the encrypted card owner information as a package to the data processing device; and wherein the data processing device is configured to: decrypt the encrypted card owner information package using its private key paired with the public key used to encrypt the card owner information.

A fifty-seventh embodiment can include the system of Embodiment 56, wherein the data processing device is arranged to decrypt the encrypted card owner information in a secure environment.

A fifty-eighth embodiment can include the system of any of Embodiments 50-57, wherein the data processing device is a mobile device that includes a native operating system that controls the hardware of the data processing device and the display is a trusted display that is controlled only by a separate system when identity checking is being performed.

In a fifty-ninth embodiment, an identity card checking method comprises: a data processing device that is communicatively coupleable to a payment instrument, the data processing device communicatively coupleable to a server via a second communication link, wherein the method comprises: initiating an identity check when the payment instrument is brought into close proximity of the data processing device to communicatively couple with the payment instrument; displaying identity information of the payment instrument registered owner on a display of the data processing device only while the payment instrument and data processing device are in close proximity, and to remove the identity information of the payment card owner from the display when the payment instrument and data processing device are not in close proximity.

A sixtieth embodiment can include the method of Embodiment 59, wherein the identity information includes an image of the payment instrument registered owner.

A sixty-first embodiment can include the method of Embodiment 59 or 60, wherein the data processing device: receives a first data package generated by the payment instrument; generates an identity request data package based on the first data package; and transmits the identity request data package to a server; wherein the first data package includes at least a unique identifier associated with the payment instrument, and wherein the identity request data package also includes the unique identifier.

A sixty-second embodiment can include the method of Embodiment 61, wherein the unique identifier is one of a PAN associated with the payment instrument and a tokenised PAN associated with the payment instrument.

A sixty-third embodiment can include the method of any of Embodiments 59-62, wherein the data processing device: transmits a read request to the payment instrument, the read request indicating that the data processing device requires information relating to the identity of a user of the payment instrument; receives the identification information from the server, the identification information including an image of a registered user of the payment instrument; and updates the display of the data processing device with at least an image of a registered user of the payment instrument if the payment instrument and data processing device are communicatively coupled.

A sixty-fourth embodiment can include the method of Embodiment 61, wherein the identity request data package includes an encrypted first data package encrypted using the server's public key prior, and includes the data processing device's public key.

A sixty-fifth embodiment can include the method of any of Embodiments 61-64, wherein the server: decrypts the identity request data package using its private key paired with the public key used to encrypt the first data package; obtains payment instrument owner information based on the information in the first data package; encrypts the payment instrument owner identification information using the data processing device's public key; and transmits the encrypted card owner information as a package to the data processing device; and wherein the data processing device: decrypts the encrypted card owner information package using its private key paired with the public key used to encrypt the card owner information.

A sixty-sixth embodiment can include the method of Embodiment 65, wherein the data processing device decrypts the encrypted card owner information in a secure environment.

A sixty-seventh embodiment can include the method of any of Embodiments 59-66, wherein the data processing device is a mobile device that includes a native operating system that controls the hardware of the data processing device and the display is a trusted display that is controlled only by a separate system when identity checking is being performed.

A sixty-eighth embodiment can include a data processing device for use in any of Embodiments 1-41 and 50-67.

A sixty-ninth embodiment can include a server for use in any of Embodiments 1-41 and 50-67.

The invention claimed is:

1. An identity card checking method comprising:
   initiating an identity check when a payment instrument including identity information of a registered owner of the payment instrument is brought into close proximity of a data processing device;
   displaying the identity information of the registered owner of the payment instrument on a display of the data processing device; and
   removing the identity information of the registered owner of the payment instrument from the display based on a location of the payment instrument.

2. The method of claim 1, wherein the identity information includes an image of the register owner of the payment instrument; and
   wherein the location of the payment instrument is not in close proximity to the data processing device.

3. The method of claim 1, wherein the method further comprises:
   receiving a first data package generated by the payment instrument;
   generating an identity request data package based on the first data package; and
   transmitting the identity request data package to a server;
   wherein the first data package and the identity request data package include at least a unique identifier associated with the payment instrument.

4. The method of claim 3, wherein the unique identifier is at least one of a PAN associated with the payment instrument or a tokenized PAN associated with the payment instrument.

5. The method of claim 1, wherein the method further comprises:
   transmitting a read request to the payment instrument, the read request indicating that the data processing device requires information relating to the identity of a user of the payment instrument;
   receiving the identification information from the server, the identification information including an image of a registered user of the payment instrument; and
   updating the display of the data processing device with at least an image of a registered user of the payment instrument when the payment instrument and the data processing device are communicatively coupled.

6. The method of claim 3, wherein the identity request data package includes an encrypted first data package and a public key of the data processing device, the encrypted first data package being encrypted using a prior public key of the server.

7. The method of claim 6, wherein the method further comprises:

decrypting the identity request data package using a private key paired with the prior public key of the server;
obtaining information of the registered owner of the payment instrument based on the information in the first data package;
encrypting the information of the registered owner of the payment instrument using the public key of the data processing device;
transmitting the encrypted information of the registered owner as a card owner information package to the data processing device; and
decrypting the encrypted card owner information package using the private key paired with the public key of the data processing device used to encrypt the card owner information.

8. A system comprising:
one or more computer readable media storing instructions for performing an identity card checking; and
one or more processors configured to execute the instructions to perform operations comprising:
initiating an identity check when a payment instrument including identity information of a registered owner of the payment instrument is brought into close proximity of a data processing device;
displaying the identity information of the registered owner of the payment instrument on a display of the data processing device; and
removing the identity information of the registered owner of the payment instrument from the display based on a location of the payment instrument.

9. The system of claim 8, wherein the identity information includes an image of the register owner of the payment instrument; and
wherein the location of the payment instrument is not in close proximity to the data processing device.

10. The system of claim 8, the operations further comprising:
receiving a first data package generated by the payment instrument;
generating an identity request data package based on the first data package; and
transmitting the identity request data package to a server;
wherein the first data package and the identity request data package include at least a unique identifier associated with the payment instrument.

11. The system of claim 10, wherein the unique identifier is at least one of a PAN associated with the payment instrument or a tokenized PAN associated with the payment instrument.

12. The system of claim 8, the operations further comprising:
transmitting a read request to the payment instrument, the read request indicating that the data processing device requires information relating to the identity of a user of the payment instrument;
receiving the identification information from the server, the identification information including an image of a registered user of the payment instrument; and
updating the display of the data processing device with at least an image of a registered user of the payment instrument when the payment instrument and the data processing device are communicatively coupled.

13. The system of claim 10, wherein the identity request data package includes an encrypted first data package and a public key of the data processing device, the encrypted first data package being encrypted using a prior public key of the server.

14. The system of claim 13, the operations further comprising:
decrypting the identity request data package using a private key paired with the prior public key of the server;
obtaining information of the registered owner of the payment instrument based on the information in the first data package;
encrypting the information of the registered owner of the payment instrument using the public key of the data processing device;
transmitting the encrypted information of the registered owner as a card owner information package to the data processing device; and
decrypting the encrypted card owner information package using the private key paired with the public key of the data processing device used to encrypt the card owner information.

15. A non-transitory computer-readable medium storing instructions for performing an identity card checking, the instructions, when executed by one or more processors, causing the one or more processors to perform operations comprising:
initiating an identity check when a payment instrument including identity information of a registered owner of the payment instrument is brought into close proximity of a data processing device;
displaying the identity information of the registered owner of the payment instrument on a display of the data processing device; and
removing the identity information of the registered owner of the payment instrument from the display based on a location of the payment instrument.

16. The non-transitory computer-readable medium of claim 15, the operations further comprising:
receiving a first data package generated by the payment instrument;
generating an identity request data package based on the first data package; and
transmitting the identity request data package to a server;
wherein the first data package and the identity request data package include at least a unique identifier associated with the payment instrument.

17. The non-transitory computer-readable medium of claim 16, wherein the identity information includes an image of the register owner of the payment instrument;
wherein the location of the payment instrument is not in close proximity to the data processing device; and
wherein the unique identifier is at least one of a PAN associated with the payment instrument or a tokenized PAN associated with the payment instrument.

18. The non-transitory computer-readable medium of claim 15, the operations further comprising:
transmitting a read request to the payment instrument, the read request indicating that the data processing device requires information relating to the identity of a user of the payment instrument;
receiving the identification information from the server, the identification information including an image of a registered user of the payment instrument; and
updating the display of the data processing device with at least an image of a registered user of the payment instrument when the payment instrument and the data processing device are communicatively coupled.

19. The non-transitory computer-readable medium of claim 16, wherein the identity request data package includes an encrypted first data package and a public key of the data processing device, the encrypted first data package being encrypted using a prior public key of the server.

20. The non-transitory computer-readable medium of claim 19, the operations further comprising:
- decrypting the identity request data package using a private key paired with the prior public key of the server;
- obtaining information of the registered owner of the payment instrument based on the information in the first data package;
- encrypting the information of the registered owner of the payment instrument using the public key of the data processing device;
- transmitting the encrypted information of the registered owner as a card owner information package to the data processing device; and
- decrypting the encrypted card owner information package using the private key paired with the public key of the data processing device used to encrypt the card owner information.

* * * * *